(12) United States Patent
Rao et al.

(10) Patent No.: US 8,989,825 B1
(45) Date of Patent: *Mar. 24, 2015

(54) RECONFIGURABLE MOBILE DEVICE WITH KEYBOARD COVER AND DISPLAY AREAS OF CONTENT AND APPLICATIONS

(71) Applicant: IP Holdings, Inc., Palo Alto, CA (US)

(72) Inventors: Raman K. Rao, Palo Alto, CA (US);
Sanjay K. Rao, Palo Alto, CA (US);
Sunil K. Rao, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,285

(22) Filed: Jul. 15, 2014

Related U.S. Application Data

(63) Continuation of application No. 14/272,248, filed on May 7, 2014, now Pat. No. 8,831,694, which is a continuation of application No. 14/152,615, filed on Jan. 10, 2014, now Pat. No. 8,744,537, which is a continuation of application No. 14/014,232, filed on Aug. 29, 2013, now Pat. No. 8,649,830, which is a continuation of application No. 13/786,680, filed on Mar. 6, 2013, now Pat. No. 8,554,287, which is a continuation of application No. 13/628,455, filed on Sep. 27, 2012, now Pat. No. 8,423,096, which is a continuation of application No. 12/876,050, filed on Sep. 3, 2010, which is a continuation of application No. 11/644,308, filed on Dec. 21, 2006, now abandoned.

(51) Int. Cl.
*H04M 1/00* (2006.01)
*H04M 1/02* (2006.01)

(52) U.S. Cl.
CPC .................................. *H04M 1/0268* (2013.01)

USPC ................... 455/575.1; 455/575.3; 455/90.3; 361/679.55

(58) Field of Classification Search
CPC ............ H04M 1/0214; H04M 1/0237; H04M 2250/22; H04M 1/0235; H04M 1/0216; H04M 1/72522; H04M 1/0245
USPC ............ 455/575.1, 575.3, 90.3, 556.1, 552.1, 455/128, 344; 361/679.55; 345/168
See application file for complete search history.

(56) References Cited

U.S. PATENT DOCUMENTS

| | | | |
|---|---|---|---|
| 5,847,698 A * | 12/1998 | Reavey et al. ................. | 345/173 |
| 6,046,730 A * | 4/2000 | Bowen et al. ................. | 345/168 |
| 6,535,749 B1 * | 3/2003 | Iwata et al. ................. | 455/556.2 |
| 6,640,114 B2 * | 10/2003 | Bae ................. | 455/566 |
| 6,747,635 B2 * | 6/2004 | Ossia ................. | 345/169 |
| 7,054,441 B2 * | 5/2006 | Pletikosa ................. | 379/433.12 |
| 7,194,086 B2 * | 3/2007 | Pletikosa ................. | 379/433.12 |
| 7,345,872 B2 * | 3/2008 | Wang ................. | 361/679.55 |
| 8,144,204 B2 * | 3/2012 | Strandwitz et al. ......... | 348/211.2 |
| 8,144,477 B2 * | 3/2012 | Hamada ................. | 361/755 |
| 8,248,789 B2 * | 8/2012 | Wu et al. ................. | 361/679.56 |
| 2003/0008679 A1 * | 1/2003 | Iwata et al. ................. | 455/556 |
| 2011/0187647 A1 * | 8/2011 | Woloszynski et al. ......... | 345/168 |
| 2012/0211377 A1 * | 8/2012 | Sajid ................. | 206/216 |

* cited by examiner

*Primary Examiner* — Minh D Dao
(74) *Attorney, Agent, or Firm* — Levine Bagade Han LLP

(57) ABSTRACT

A multifunction cover with touch screen display, icons, and a keyboard is described. A multifunction touch screen enabled mobile device may be configured to be connected to the separate cover, which may be attached to the device and detached from the device. The mobile device may be enabled with a cellular voice and data communication, WiFi connectivity, Bluetooth connectivity, and Internet Protocol connectivity. The mobile device may be enabled to play videos, capture photos, and stream multimedia content.

30 Claims, 18 Drawing Sheets

RECONFIGURABLE MOBILE DEVICE WITH KEYBOARD COVER AND DISPLAY AREAS OF CONTENT AND APPLICATIONS

CROSS-REFERENCE TO RELATED APPLICATIONS

This application is a continuation of U.S. application Ser. No. 14/272,248 filed May 7, 2014, which is a continuation of U.S. application Ser. No. 14/152,615 filed Jan. 10, 2014 (now U.S. Pat. No. 8,744,537), which is a continuation of U.S. application Ser. No. 14/014,232 filed Aug. 29, 2013 (now U.S. Pat. No. 8,649,830), which is a continuation of U.S. application Ser. No. 13/786,680 filed Mar. 6, 2013 (now U.S. Pat. No. 8,554,287), which is a continuation of U.S. application Ser. No. 13/628,455 filed Sep. 27, 2012 (now U.S. Pat. No. 8,423,096), which is a continuation of U.S. application Ser. No. 12/876,050 filed Sep. 3, 2010, which is a continuation of U.S. application Ser. No. 11/644,308 filed Dec. 21, 2006 (now abandoned); the content of each of which is incorporated herein by reference in their entireties.

ABBREVIATIONS

Cellular Telephone is abbreviated as CT
Mobile Device is abbreviated as MD.
Personal Computer is abbreviated as PC
Peripheral Device is abbreviated as PD
Transaction Terminal is abbreviated as TT
Point Of Sale is abbreviated as POS
Television is abbreviated as TV
Personal Digital Assistant is abbreviated as PDA
Central Server is abbreviated as CS
Local Server is abbreviated as LS
Network Server is abbreviated as NS

BACKGROUND

Mobile communication devices are being adopted at a significant and increasing rate by the public due to their portability, ease of use, small form factor and low entry level system cost for the mobile device itself; and for the almost universal connectivity provided by a number of wireless carriers at a an affordable subscription price. Hitherto most of the mobile device applications revolved around voice communication and to some limited extent for email and data communication.

As the mobile devices evolve into multifunction communication, computation, command and control devices there is a need for better user interfaces. Mobile devices that can provide audio and video services are highly desired by the users. The quality of the audio depends to a large extent on the digital signal processing, DSP capability internal to the mobile device and one or more of the built-in speakers within the mobile device itself; and the external speakers/earphones attachments available for delivering the audio experience to the user.

In the prior art, when it comes to the video experience, there is a fundamental problem that arises from the very advantage of the mobile device, namely its portability and small form factor, which on the other hand significantly limits the viewing area for images, graphics and video. Consequently there is a need for providing novel visual interfaces for enhancing the viewing experience of the user for images, graphics and video. The present invention teaches devices and interfaces that can provide enhanced visual experience and a rich multimedia experience to the mobile device user. In the cross referenced applications cited, Rao et al teach dynamically configurable interfaces for mobile devices. The present continuation in part application teaches novel devices and methods for enhanced configurable visual interfaces for mobile devices. Additionally, the prior art displays did not utilize dedicated and special purpose video processors such as video signal processors, as the emphasis in the prior art was on displaying simple graphics, numbers and text messages. Additionally, there is a need for the mobile device to be configured for use for video, audio and television broadcast programming.

Similarly, in the prior art the quality of the audio is less than desirable as the cellular telephone and other mobile devices such as Personal Digital Assistants, PDAs and portable computers are primarily designed for voice and not high quality music. The stereophonic effect is achieved through the ear phone attachments which often cause discomfort and with prolong wear cause hearing loss. Consequently there is need for special purpose audio signal processors to deliver enhanced audio quality and superior noise suppression and noise cancellation.

In addition in the prior art the cellular telephone/mobile device is used mostly as an adjunct device and not as the primary device with universal utility and the ability to operate at anytime and anywhere, be it at home, at the office or on the road. There is therefore a need for the cellular telephone/mobile device to achieve, much needed primacy in all environments with the ability to operate seamlessly across different communication protocols and different environments in one or more of wired and wireless networks.

Additionally, there is a need for authentication of the user and for the provision of content and services based on criteria such as pre-payment or the promise to pay in the future for services provided for a defined service. Content development is expensive and is often copy right protected. The prior art does not teach the authentication of the user including biometric authentication of the user for the provision of multimedia services and content over a wired or wireless network to mobile devices. The prior art methods of authentication based on encryption and digital keys lend themselves to subversion by the sophisticated user through software means, thus defrauding the rightful owners of the copyrighted material from enjoying the fruits of their investment and in the process raising the price that all other legitimate subscribers have to pay for the services and the content.

SUMMARY

The invention describes a system for configuring novel visual interfaces for use on various types of devices such as cellular telephones, mobile devices, PDAs, lap top computers and other types of mobile communication, computation, command and control devices. These novel visual interfaces when used in conjunction with rich multimedia communications comprising voice/speech, audio, video, graphics such as in games and television, TV, broadcast programs provide enhanced utility to the mobile device user.

The invention additionally describes a system level architecture for designing and configuring a mobile device as a multimedia mobile device. The system level architecture comprises of various types of electronic circuitry and components such as a plurality of general purpose processors, a plurality of special purpose processors including audio signal processors and video signal processors, plurality of graphics chipsets, plurality of display drivers and a multi-channel transceiver for providing high quality audio, video and graphics for the purpose of providing the performance needed to power the plurality of novel visual and audio interfaces of the proposed novel configurable multimedia mobile device.

Additionally, the invention comprises of a multi-channel transmitter and receiver built into the multimedia mobile device in order for the mobile device to communicate on one or more of input and output channels utilizing disparate communication protocols, such as one communication protocol for voice/speech, another for audio, another for video, another for broadcast TV, for seamless rich multimedia experience with a single mobile device. Further the invention teaches the integration and networking of the mobile device within various multimedia environments of the future whether it is at home, at the office, in the factory or on the move in transportation environment. The system level scheme for networking and enabling multimedia communications utilizing the mobile devices is enabled in disparate environments in conjunction with a multi-channel transmitter/receiver/router unit located in these environments for seamlessly enabling communication between and among a host of smart/intelligent devices such as TV, media center devices and other peripheral devices that are likely to be part of said environments for providing enhanced utility to the user.

Further, the present invention teaches the authentication of the user in conjunction with biometrics. The authentication system of the present invention ensures that the content is operative and is available to the specific intended user for a specific item of content/service at a specific time on a specific device. The invention teaches the use of biometric authentication as one of a set of tools for ensuring a very high level of copy right protection. In the future, the content and the secure delivery of multimedia content over wired and more importantly wireless networks is of significant economic and social importance to the user and the provider.

Various other important teachings of the present invention are also enumerated and described below. Embodiments other than those described herein may become apparent to those knowledgeable in the art, and the invention is thus not to be construed as limited to the specific description provided herein.

1. The present invention enables the configuration of mobile multifunction communication, computation, command and control devices with enhanced user interfaces for audio and video.
2. The present invention enables the reconfiguration of mobile multifunction communication, computation, command and control devices with attachments that provide enhanced user interfaces for audio and video.
3. The present invention enables novel interfaces that enhance the functionality and utility of mobile devices for use in conjunction with rich multimedia applications, streaming audio, streaming video, high definition television, IP television, broadcast programs, gaming and other content and media intensive applications.
4. The present invention includes an authentication system that authenticates the device and its associated user for the provision of content and copy right material via biometric authentication.
5. The present invention enables the seamless and secure delivery of multimedia content over wired and wireless networks at anytime and anywhere.
6. The present invention overcomes the limitations associated with the small for factor of the mobile devices via novel reconfigurable displays for enhancing the viewing experience of the user for images, graphics and video.
7. The present invention includes a plurality of dedicated signal processors for the provision of high quality audio, video, images, graphics, TV and broadcast programs.
8. The present invention includes a plurality of speakers for delivering superior surround sound quality over mobile devices.
9. The present invention includes a plurality of microphones for acquiring superior voice/speech and audio information.
10. The present invention includes a plurality of general purpose processors for the provision of high quality audio, video, images, graphics, TV and broadcast programs.
11. The present invention includes a plurality of display drivers for provision of video, images, graphics, TV and broadcast programs.
12. The present invention includes a plurality of input/output ports for multi-channel processing of audio, video and broadcast information.
13. The present invention includes a plurality of built-in display screens for the viewing of images, graphics, photos and video.
14. The present invention includes a plurality of reconfigurable display screens for enhancing the viewing of images, graphics, photos and video.
15. The present invention includes a plurality of display screens easily snap in/snap out attachments for enhancing the viewing of images, graphics, photos and video.
16. The present invention includes a multi-channel transmitter and receiver for communication of information in conjunction with one or more communication protocols on the inputs and the outputs of the mobile device.
17. The present invention includes the dynamic configuration of a mobile device as a mobile server for performing one or more functions of a server.
18. The present invention includes the dynamic configuration of a mobile device as a mobile server for streaming audio and video content to a plurality of mobile devices at anytime and anywhere.
19. The present invention configures the front and reverse sides of a mobile device for viewing and performance of useful operations.
20. The present invention configures the mobile device with multiple display screen attachments that swivel around an axis to create a seamless three dimensional visual experience for delivering movies, TV, gaming and other applications.
21. The present invention configures the mobile device for use in command and control of a media center and related devices.

Other features of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 shows the illustration of a double sided mobile device wherein each of the two sides comprise of a partial or full function mobile device with a display area and a keyboard area.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

For example, the embodiments that follow relate to a system and networking architecture, a system and apparatus with particular reference to cellular telephones/mobile devices, but are also intended to include stationary units as well, such as personal computers (PCs), transaction terminals, point of sale terminals, servers and other wired or wireless enabled devices.

Figure 1:
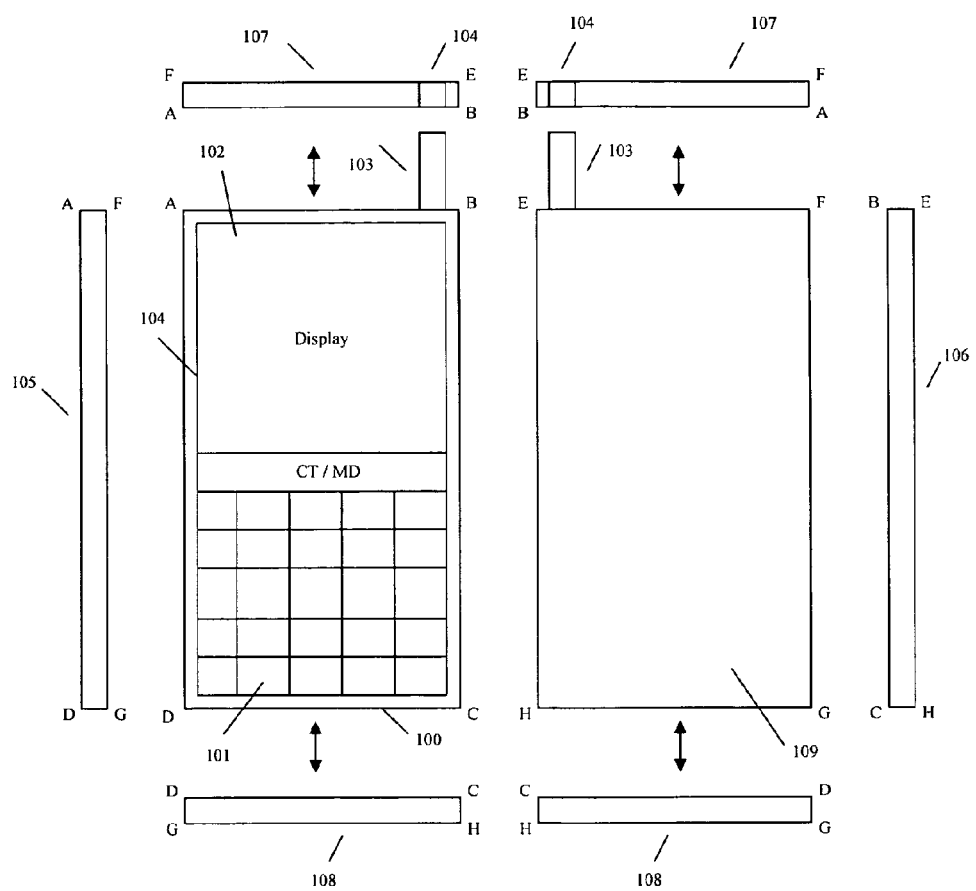
FIG. 1 shows a cellular telephone/mobile device of the prior art with the six separate surface areas of this three dimensional object shown in detail. The front surface area is the area that is mostly used in the prior art with limited functional use provided by the five remaining surface areas of the mobile device.

Referring to FIG. 1 in specific detail a cellular telephone/mobile device, 100, of the prior art with the six separate surface areas of this three dimensional object is shown in detail. The front surface area is the area that is mostly used in the prior art with limited functional use provided by the five remaining surface areas of the mobile device. The front surface area represented by the surface ABCD, comprises of a keyboard 101, a display area 102, an antenna 103, the plastic rim surrounding the keyboard and the display 104, a left side surface AFGD, 105; a right side surface, BECH, 106; a top side surface, AFEB, 107; a bottom side surface, DCGH, 108; and a back surface area, EFGH, 109.

The figure illustrates in detail the cellular telephones/mobile devices, 100, of the prior art which fail to fully leverage one or more of the various sides/surfaces of the three dimensional object for providing enhanced functional utility to the user. There is a need for providing enhanced utility as the cellular telephones/mobile devices by their very nature are portable and are configured to be light weight with a small form factor.

Figure 2:
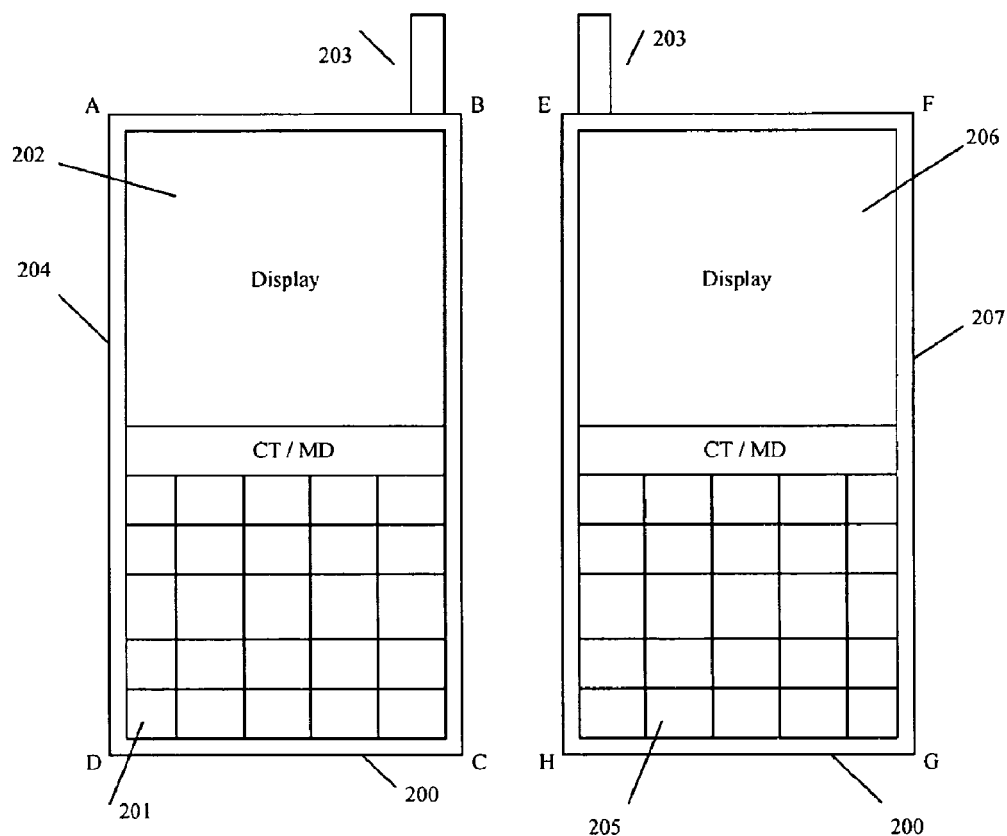
FIG. 2 shows a cellular telephone/mobile device of the present invention wherein the front side represented by the planar surface ABCD and the rear/obverse surface area represented by the planar surface EFGH are both used to provide functional utility.

In an embodiment of the present invention, FIG. 2 shows a cellular telephone/mobile device, 200 of the present invention wherein the front side is represented by the planar surface ABCD and the rear/obverse side/surface area is represented by the planar surface EFGH, wherein both sides/surfaces of the device are used to provide enhanced functional utility. FIG. 2 shows the illustration of a double sided mobile device wherein the front side comprises of a keyboard 201, a display 202, an antenna 203, and a front side rim area 204 encasing the keyboard and the display; rear/obverse side comprises of a keyboard 205, a display 206, an antenna 203, and a rear side rim area 207 encasing the keyboard and the display.

Examples of the utility of the novel double sided cellular telephone/mobile device of the present invention:

Example 1

The front side may be used for communication intensive functions such as voice, text and email with a full or partial function keyboard and a display area of a first type that is of sufficient resolution characteristics for said functional utility. The rear side may be used for the same function or a different function wherein the specific functions may be more video and graphics intensive requiring one or more of a different type of keyboard and a display with enhanced resolution on said second side display of the device. In addition two separate and independent activities may be conducted contemporaneously utilizing the dual functional capabilities of the CT/MD, such as two separate computational intensive operations being performed one on each side of said device.

Figure 3:
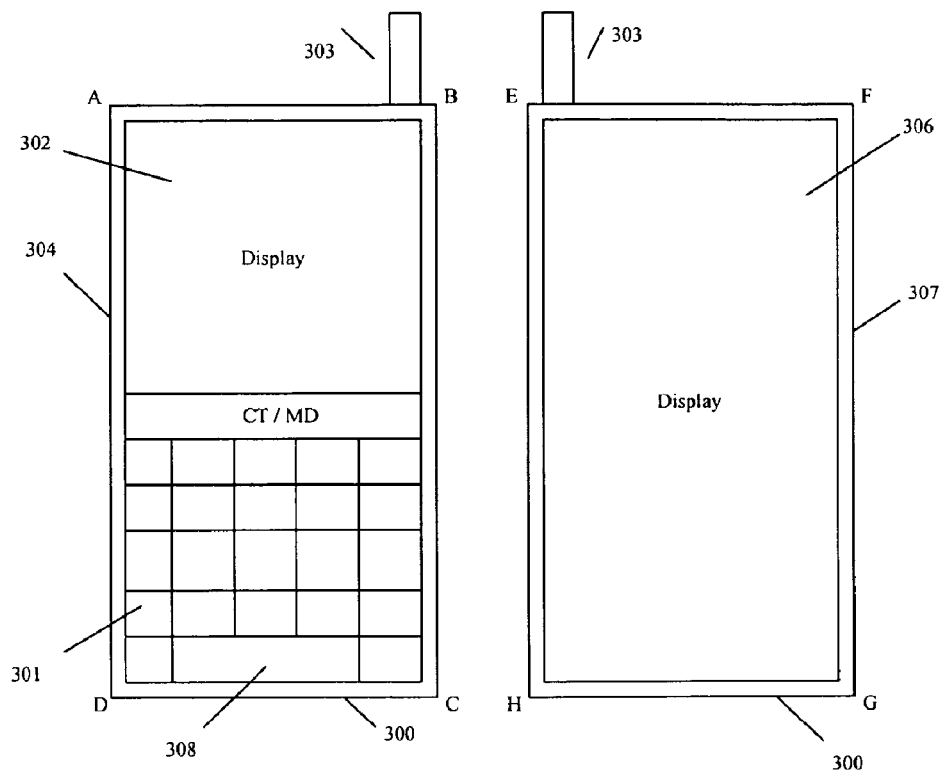
FIG. 3 shows a cellular telephone/mobile device of the present invention with the front side of the device configured with a display area and a keyboard; and the reverse/obverse side configured with a large display area for enhanced viewing.

In another embodiment of the present invention, FIG. 3 shows a cellular telephone/mobile device 300, of the present invention with the front side of the device, ABCD, configured with a keyboard 301, a display area 302, an antenna 303, a rim area surrounding the keyboard and the display 304; a biometric information acquisition port/surface 308 configured for the acquisition of one or more of hand writing, finger print, retinal scan and a camera for acquisition of photos/images of the individual; and the reverse/obverse side, EFGH, configured with a large display area, 306 for enhanced viewing, and a rim area that provides mechanical support surrounding the display 307.

Example 2

The cellular telephone/mobile device of the present invention may be configured with a standard keyboard and display on one side of the device and a large display area, 306, on the reverse/obverse side for video, image and graphics intensive applications. The display are on one side may be of a first display technology such as an LCD touch screen and the display area on the other side may be of a same technology or a second display technology such as that of a digital light processing, DLP technology/plasma technology for providing enhanced video, image and graphics resolution. Video, image and graphics intensive applications such as for high definition television and gaming require better screen/display characteristics. The present invention enables two different display technologies to be appropriately utilized independently one for each side to achieve the quality, performance and overall device cost objectives.

Example 3

Applications in medicine and health care require the use of high resolution display technologies especially for viewing X-ray, computer tomography scans, MRI, ultrasound images and other types of images, graphics and video to discern image details of great significance in diagnosing and properly treating patients. The prior art cellular telephones/mobile devices do not provide display areas that are either adequate in size or that are of high enough resolution. The present invention enables the cellular telephones/mobile devices to be configured with disparate display technologies and further provides utility for treatment of patients at home such as in telemedicine, at the office and in the hospital utilizing wired and wireless technologies.

Figure 4:
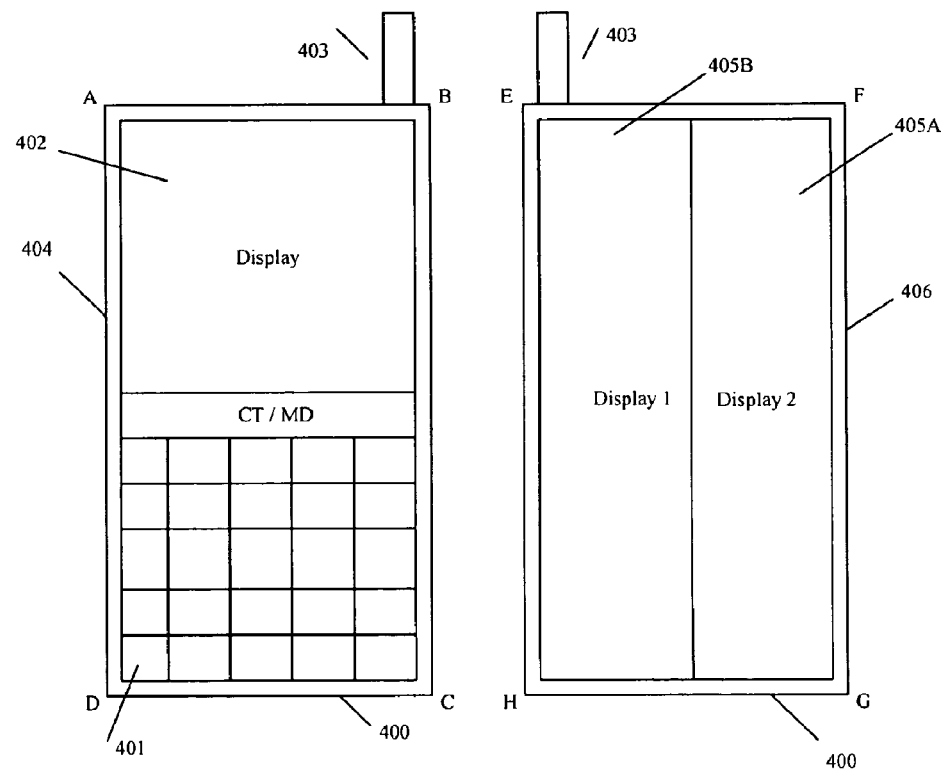
FIG. 4 shows a cellular telephone/mobile device of the present invention with the front side of the device configured with a display area and a keyboard; and the reverse/obverse side configured with a large display area partitioned into two display areas for independent and enhanced viewing of same or dissimilar information in each of said display areas.

In another embodiment of the present invention, FIG. 4 shows a cellular telephone/mobile device, 400, of the present invention with the front side, ABCD, of the device configured with a display area, 402 and a keyboard, 401, a rim area 404 and an antenna 403; and the reverse/obverse side, EFGH, configured with two larger display areas 405A and 405B for independent and enhanced viewing of same or dissimilar information in each of said partitioned display areas. The rim surrounding the display area is represented by 406. The display areas 405A and 405B may be configured with a mechanical rim that separates the two areas. Alternately the two display areas may be separated by software means for being presented as two distinct and separate display areas. The two separate display areas may be merged by software means into one larger display area by user selection and the reverse thereof by user selection. In a configuration wherein there is a mechanical rim separating the two displays areas, each display may be configured with same or different display technologies. A display technology is intended to include one or more of the material of the display and the electronics/software technology associated with rendering the images to be displayed on said display.

Example 4

The present invention provides for the viewing of two separate television programs or other content side by side on each of the display areas enabling the user to multiplex between two distinct functions and tasks. As another example the user may contemporaneously work on two computational intensive tasks on each of said display areas. The present invention also enables each screen to be configured with same or different display technologies.

Figure 5:
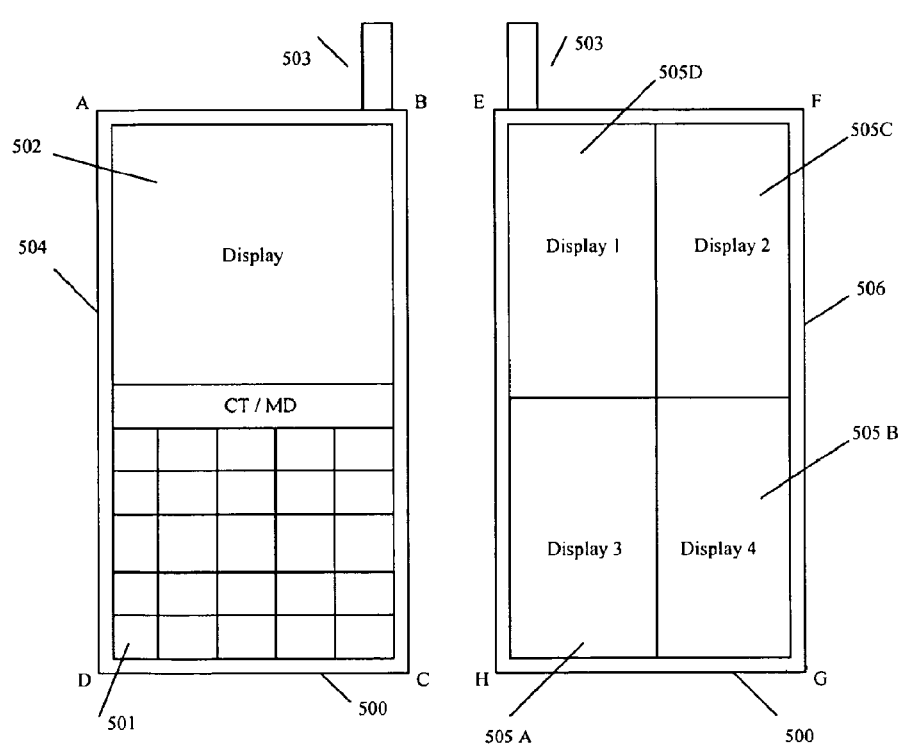
FIG. 5 shows a cellular telephone/mobile device of the present invention with the front side of the device configured with a display area and a keyboard; and the reverse/obverse side configured with a large display area partitioned into four display areas for independent and enhanced viewing of same or dissimilar information in each of said display areas.

In yet another embodiment of the present invention, FIG. 5 shows a cellular telephone/mobile device, 500, of the present invention with the front side of the device, ABCD, configured with a display area, 502, a keyboard, 501, an antenna 503 and a rim area 504; and the reverse/obverse side, EFGH, configured with a large display area partitioned into four display areas 505A, 505B, 505C and 505D for independent and enhanced viewing of same or dissimilar information in each of said display areas. The rim surrounding the display area is represented by 506.

Example 5

The present invention enables the configuration wherein the device is configured physically with four separate display areas comprising the same or different display technologies for viewing one or more types of same or dissimilar content. An example in medicine and health care is the presentation of four different types of images, wherein the images represent information acquired from the four directions of an object, in order for the health care professional to view the images from different angles and obtain a comprehensive understanding of the images for enhanced diagnosis and improved patient health care. Similarly images of mechanical and other objects may be contemporaneously viewed from different angles. Another example is the viewing of the same image or different images from a first period in time to one or more other periods in time. This enables time domain analysis of health care and other images.

Figure 6:
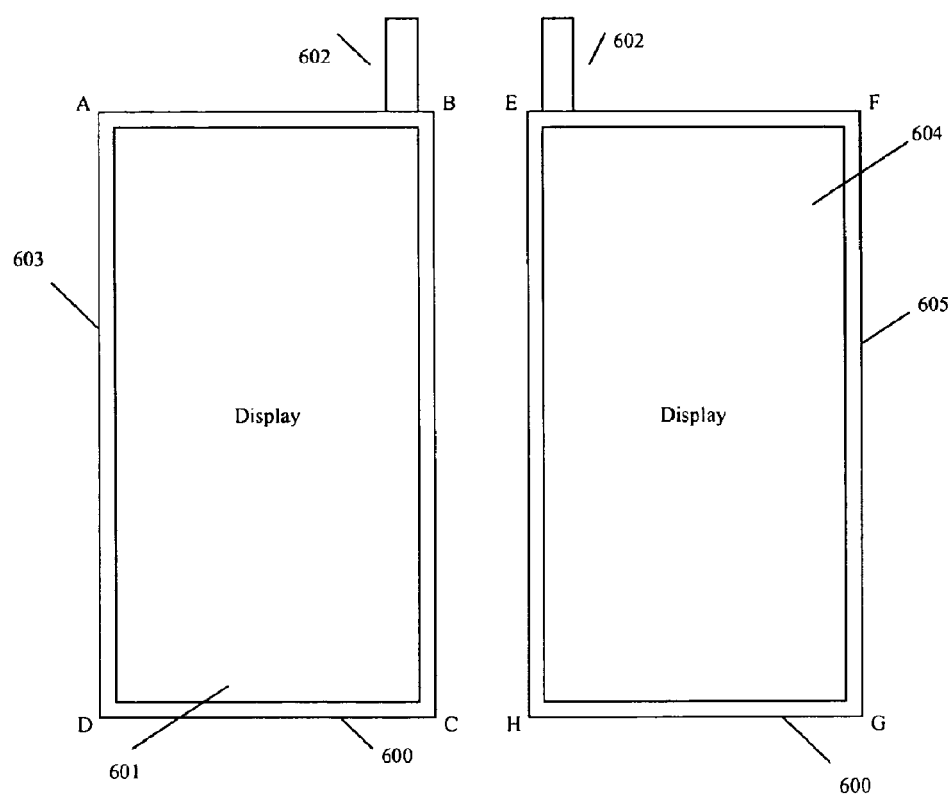
FIG. 6 shows a cellular telephone/mobile device of the present invention with the front side of the device configured with a full display area with the absence of a keyboard; and the reverse/obverse side configured with a large display area for independent and enhanced viewing of same or dissimilar information in each of said display areas on the front side and obverse side.

In another embodiment of the present invention, FIG. 6 shows a cellular telephone/mobile device, 600 of the present invention with the front side, ABCD of the device configured with a full display area, 601 surrounded by a rim area 603, an antenna 602 wherein in this configuration there is no standard mechanical keyboard; and the reverse/obverse side, EFGH configured with a large display area, 604 surrounded by a rim area 605. In this configuration the cellular telephone mobile device has two independent and enhanced large display areas of same or dissimilar display technologies. The information displayed on each of said display areas on the front side and obverse side may be same or dissimilar. Either one or both of the displays may be touch screen enabled. Additionally, a virtual keyboard may be presented on any location of the display for easy touch enabled keyboard entry of information.

Example 6

The dual sided display capability enables two individuals to view the same content from opposite sides of the same mobile device. This is generally useful wherein two individuals sit across a desk and it is often inconvenient for an individual to move to the other side. In the prior art the lap top computer or the display of a stationary device has to be moved around at an angle for two individuals to view the same display screen. In the present invention the lap top computer screen may be dual sided such that the same or different content can be viewed by one or more individuals from each of said display screens. In the present invention the same content may easily be viewed by two individuals from opposite angles or other angles without having to move the device. Additionally, LCD and other displays often have different image characteristics when the same display screen is viewed from different angles. There is image distortion when the screen is viewed from different angles. The present invention overcomes this limitation of the prior art.

Example 7

In the prior art the transaction terminals/point of sale terminals and their associated display screens are positioned for best viewing by the sales clerk and not that of the customer. This results in some customer dissatisfaction as to the actual transaction that is being rung up. In the present invention a dual sided display screen of a mobile device/stationary device that presents the information on both sides of a display overcomes this significant limitation and enhances the means for communication and collaboration between individuals improving customer satisfaction and reducing errors in ringing up sales. The dual sided display capability may be achieved by configuring two individual display screens positioned back to back with an opaque coating separating the two display areas or this may be achieved via a mechanical separation between the two separate display screens that are positioned back to back.

Example 8

Similarly two students may easily collaborate with each other using stationary devices that have a dual sided display capability. Mobile devices may easily be stood up on the bottom surface area and two students may view similar or dissimilar content from each side. Additionally, the mobile device may be swiveled around a vertical axis such that individuals sitting around the mobile device may easily view the content from a first side of the display or the reverse side of the display.

Example 9

The two display areas may be configured as touch sensitive display areas for independently actuating one or more types of functions and utilities from each side. This capability is of significant value as each side essentially serves as an independent device providing dual functionality. As an example in this configuration two students may work independently on the same mobile device by accessing the device from opposite sides such as when the device is held erect on its bottom edge.

Example 10

The user may independently work on two separate tasks using the same device by simply rotating the device and viewing each of the front and back display areas alternately as desired. The large display areas provide enhanced images, graphics and video. The display technology used on each side may be same or different.

Figure 7:
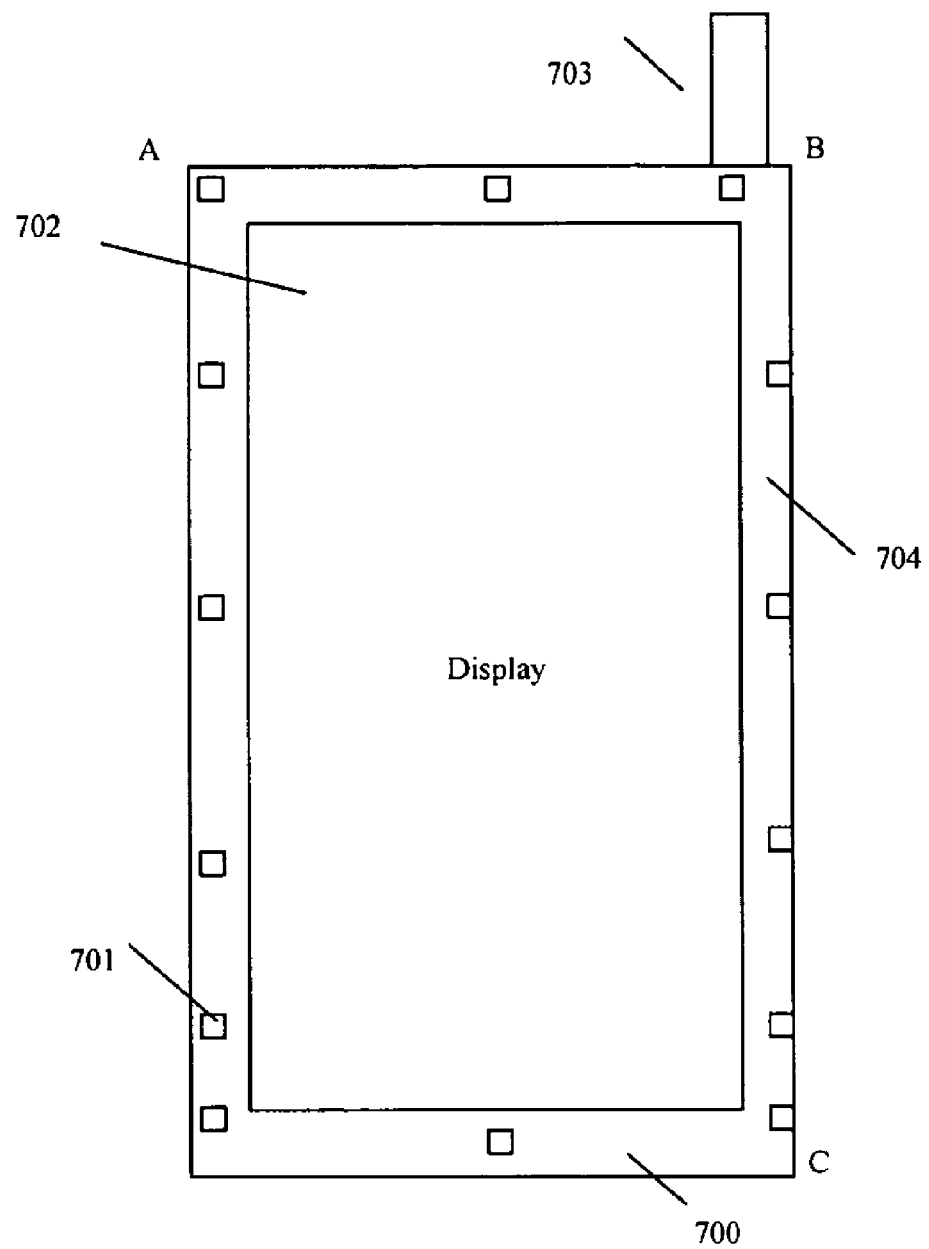
FIG. 7 shows a cellular telephone/mobile device of the present invention with the front side of the device configured with a full display area with the absence of a keyboard; and the surrounding rim of the front of the device configured with a plurality of switches or mechanism for actuating an intended action/function.

In another preferred embodiment, FIG. 7 shows a cellular telephone/mobile device, 700 of the present invention with the front side of the device configured with a full display area, 702 with the absence of a keyboard and an antenna 703; and the surrounding rim surface area, 704 of the front of the device configured with a plurality of keys/switches/mechanisms, 701 for actuating an intended action/function. In this configuration most of the surface area of the cellular telephone/mobile device is used for the display providing enhanced viewing convenience to the user for image, graphics and video intensive applications. The present invention enables the utilization of the rim area whereas in the prior art the rim area provided mostly mechanical rigidity and limited functionality for actuating communication, command, control and other functions deemed necessary by the user. A plurality of keys, switches and actuating mechanism for actuating one or more functions may be located all around the front rim surface of the cellular telephone mobile device.

In yet another preferred embodiment one or more of the keys, switches and actuating mechanisms may be configured for visualization by optical/light means with one or more colors for easily distinguishing a first function actuation mechanism from a second function actuation mechanism.

Example 11

An actuation key/switch/mechanism configured for visualization with the color red may be designated for emergency response in case of a potential security threat to the user, where in upon actuation by the user a macro function that communicates with the police is initiated. The macro function may be programmed by the user by software means to initiate and complete an intended action. The actuation key/switch/mechanism may be lighted to show the red color or alternately it may have a red color painted on said mechanism. The color with which an actuation mechanism is lighted may be changed from a first color to a second color by user selection and programming. Similarly, another actuation mechanism may be configured with the color blue to communicate via a macro function with emergency health care personnel and health care facilities. The present invention readily enables the cellular telephone mobile device to be of great utility for geriatric and physically impaired individuals. The actuation key/switch/mechanism may be configured for example with Braille capability for the visually impaired and configured with light for the hearing impaired. The actuation mechanism may be configured with preferred colors for those that desire choice or those that require it by necessity such as individuals that are color blind to certain colors.

In yet another preferred embodiment of the present invention, an actuation key/switch/mechanism may be software configurable from a first function to a second function. In the prior art the switches/dials and other actuation mechanisms are provided on a cellular telephone/mobile device with a predetermined/pre-wired function and location on said device. Often users prefer a separate location on the device for an actuation key/switch/mechanism. This is especially true for individuals that are right handed versus others who are left handed. The present invention enables a physically hard wired key/switch/mechanism to be programmed by software means from a first function to a second function. For example two actuation mechanisms physically located on the left side and right side may be swapped by software means to perform different user selected functions whereby without physically relocating the key/switch/actuation mechanisms the user is still enabled to achieve the intended function in conjunction with an key/switch/actuation mechanism located in an alternate location. While the examples cited are for mobile device applications, they are also applicable to stationary devices and instrumentation panels such an in automobiles. This novel feature of the present invention enables one or more of a pre functioned defined and pre positioned key/switch/mechanism to be user configurable. The present invention teaches the capability for dynamically reconfiguring a key/switch/actuation mechanism from a first function to a second function and further enables the virtual placement/transfer of the function from a first location on the device interface to a second location on the device interface.

Figure 8:
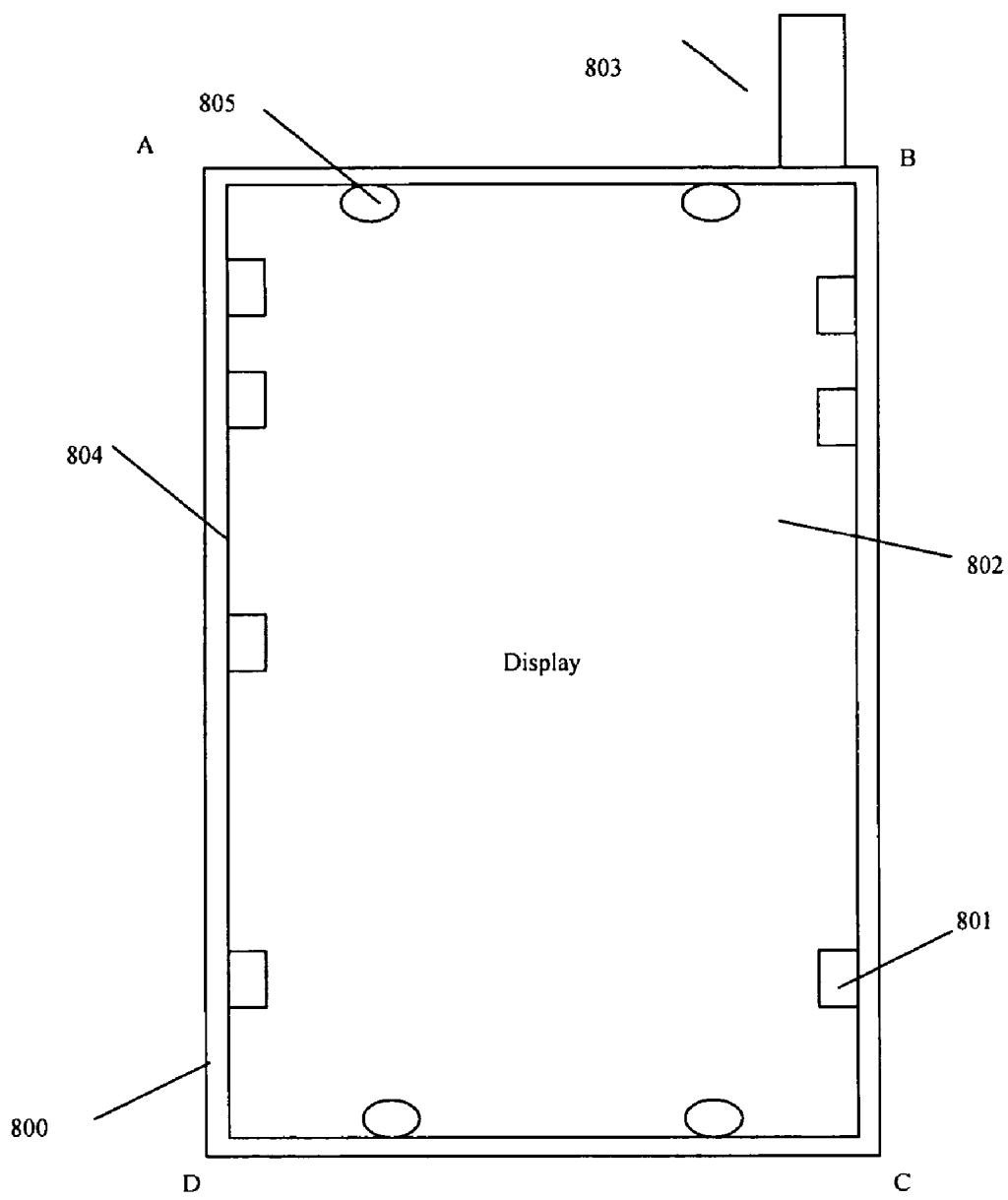
FIG. 8 shows a cellular telephone/mobile device of the present invention with the front side of the device configured with a full display area with the absence of a keyboard; and the area representing the periphery of the display configured with a plurality of touch enabled icons for actuating an intended action/function wherein said icons may be in any geometric form.

In another embodiment of the present invention, FIG. 8 shows a cellular telephone/mobile device, 800, of the present invention with the front side of the device, ABCD, configured with a full display area, 802, with the absence of a keyboard; and the area representing the periphery of the display configured with a plurality of touch enabled icons, 801 and 805, for actuating an intended action/function wherein said icons may be configured in one or more of any geometric form, alpha numeric characters, and colors. The antenna is represented by 803 and the peripheral rim area surrounding the display by 804.

A plurality of the icons, 801 and 805 may be positioned anywhere on the display, however in one preferred embodiment they are positioned along the periphery of the rim to maximize the actual viewable display area. The icons are intended to be touch sensitive for initiation of an intended action, command and control function by means of a touch or stylus tap/touch. Under the control of the user, one or more of the icons may be configured to disappear into the background to further enhance the actual viewable display area; and the icons may be configured to appear in the foreground as needed to initiate an action by touch sensitive means.

Figure 9:
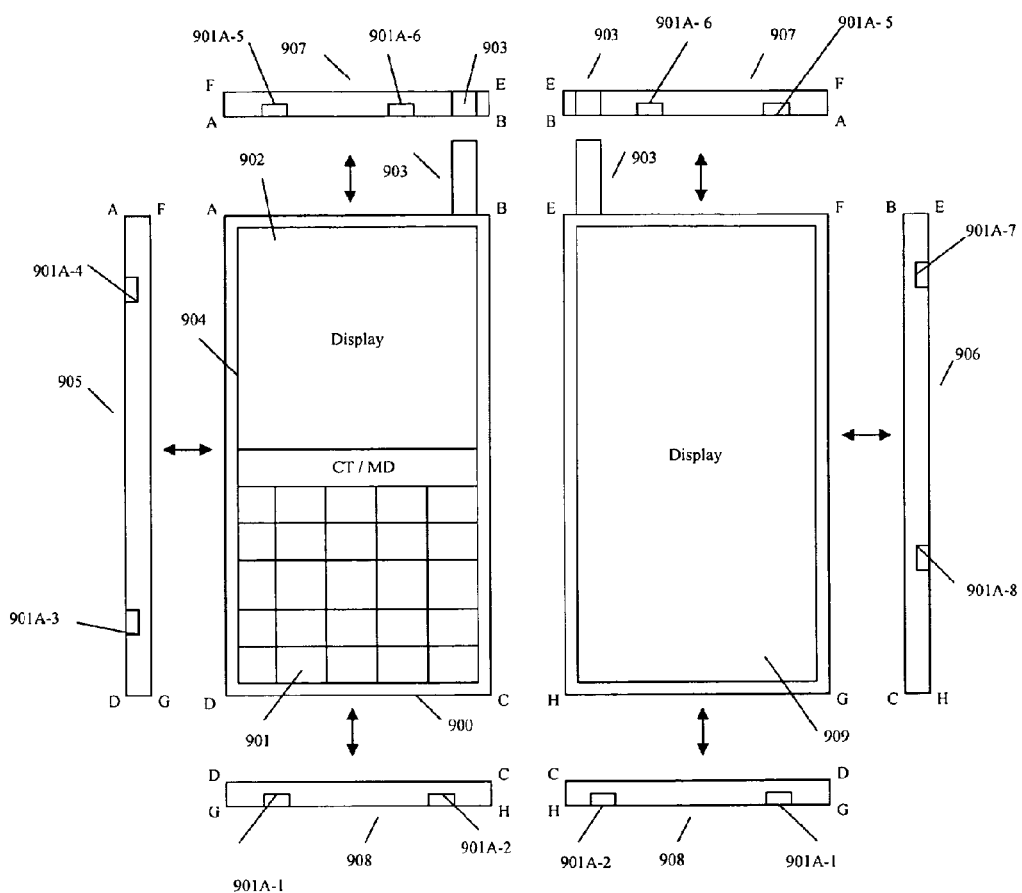
FIG. 9 shows a cellular telephone/mobile device of the present invention with the front side of the device configured with a display area and a keyboard and the obverse side configured with a full display area; and one or more of the remaining four sides of the device configured with a plurality of switches or mechanism for actuating an intended action/function.

In yet another embodiment of the present invention, FIG. 9 shows a cellular telephone/mobile device, 900, of the present invention with the front side of the device, ABCD configured with a display area, 902, a keyboard, 901, an antenna 903 and a rim area 904. The obverse side of the device, 900, is configured with a full display area, 909 surrounded by a backside rim area for mechanical support. The rim may be configured to be at a slightly higher planar level than the display to obviate the display area from touching a rough surface with the objective of providing scratch protection and protection from breakage. Additionally, the single sided and double sided display screens of the cellular telephones/mobile devices of the present invention may be configured with a protective casing on each side for protection against damage and breakage of the display areas and the device itself.

In another preferred embodiment of the present invention the front and backside of the device are used for providing enhanced functionality in conjunction with one or more of the remaining four surface areas of the device. The left side represented by the surface AFGD, 905 may be configured with one or more keys/switches and mechanisms, 901A-3 and 901 A-5 for actuating a selected function. The right side represented by the surface BEHC, 906 may be configured with one or more keys/switches and mechanisms, 901A-7 and 901 A-8 for actuating a selected function. The top side represented by the surface AFEB, 907 may be configured with one or more keys/switches and mechanisms, 901A-5 and 901 A-6 for actuating a selected function. The bottom side represented by the surface DCHG, 908 may be configured with one or more keys/switches and mechanisms, 901A-1 and 901 A-2 for actuating a selected function. The number of keys/switches/mechanisms that may be provided on each of the surface areas, 905, 906, 907 and 908 depend on the form factor of the cellular telephone/mobile device.

In another embodiment of the present invention one or more of the surface areas, 905, 906, 907 and 908 may be configured with displays that are defined by the surface area, wherein the surface area of the display depends on the size of the cellular telephone/mobile device and its form factor. The display areas 905, 906, 907 and 908 may be configured to be touch sensitive wherein a plurality of touch sensitive action control icons may be provided.

Example 12

The present invention enables all six surface areas of a cellular telephone/mobile device to be utilized for providing one or more of functionality and display. The cellular telephone/mobile device may be configured for any of the desired form factors. As an example a form factor of a cube provides six equal surface areas wherein one or more of the six surface areas may be configured with a display to view content on one or more of the surface areas of said device. The present invention enables a mobile device to be designed and manufactured in one or more form factors that serve the needs of a spectrum of users with varying visualization and functional needs.

Figure 10:
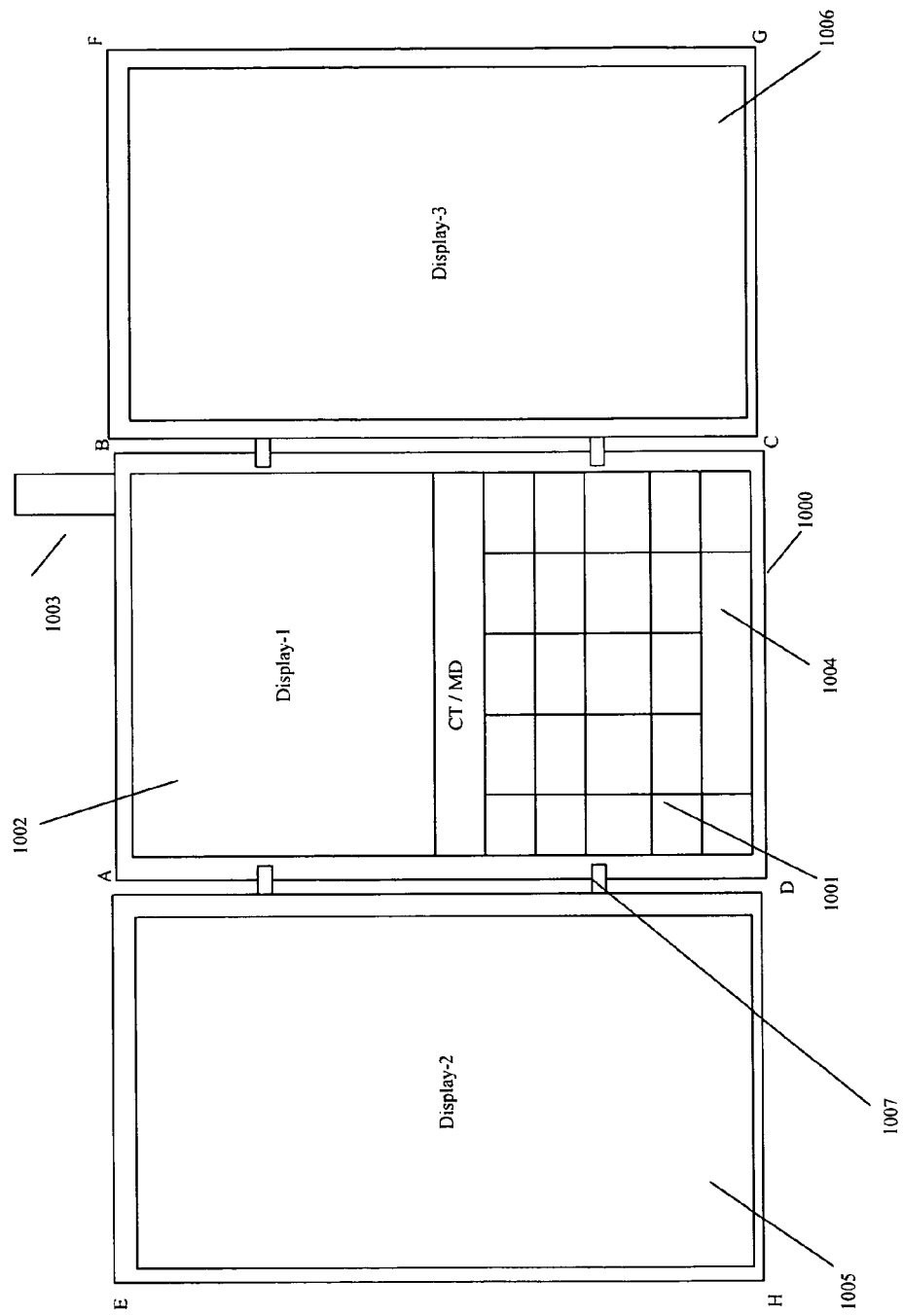
FIG. 10 shows a cellular telephone/mobile device of the present invention with the front side of the device configured with a display area and a keyboard and further enabled for attachment of a separate display to the left and right side of said mobile device.

In another embodiment of the present invention, FIG. 10 shows a cellular telephone/mobile device, 1000 of the present invention with the front side, ABCD of the device configured with a display area, 1002, a keyboard, 1001, an antenna 1003 and a biometric authentication port 1004; and further enabled for attachment of a separate display 1005 to the left and 1006 to the right side of said cellular telephone/mobile device. A mechanism and wired communication path, 1007 enables the attachment of the left and right display areas to the cellular telephone/mobile device 1000 and the communication of the information from the device 1000 to each of said display attachments. Alternately, the communication may be by wireless means between the device 1000 and the display 1005 and 1006. The attachment mechanism enables one or more of the left display and right display to rotate around the axis formed by AD and BC respectively for viewing convenience. Additionally, the rear side of 1002, 1005 and 1006 may be configured to serve as three large displays, providing additional utility for conferencing and collaboration between one or more individuals.

Example 13

The display 102 may be used for email, the display 1005 for viewing sports and the display 106 used for watching a TV program on said mobile device. Each display may utilize same or different display technologies.

Figure 11:
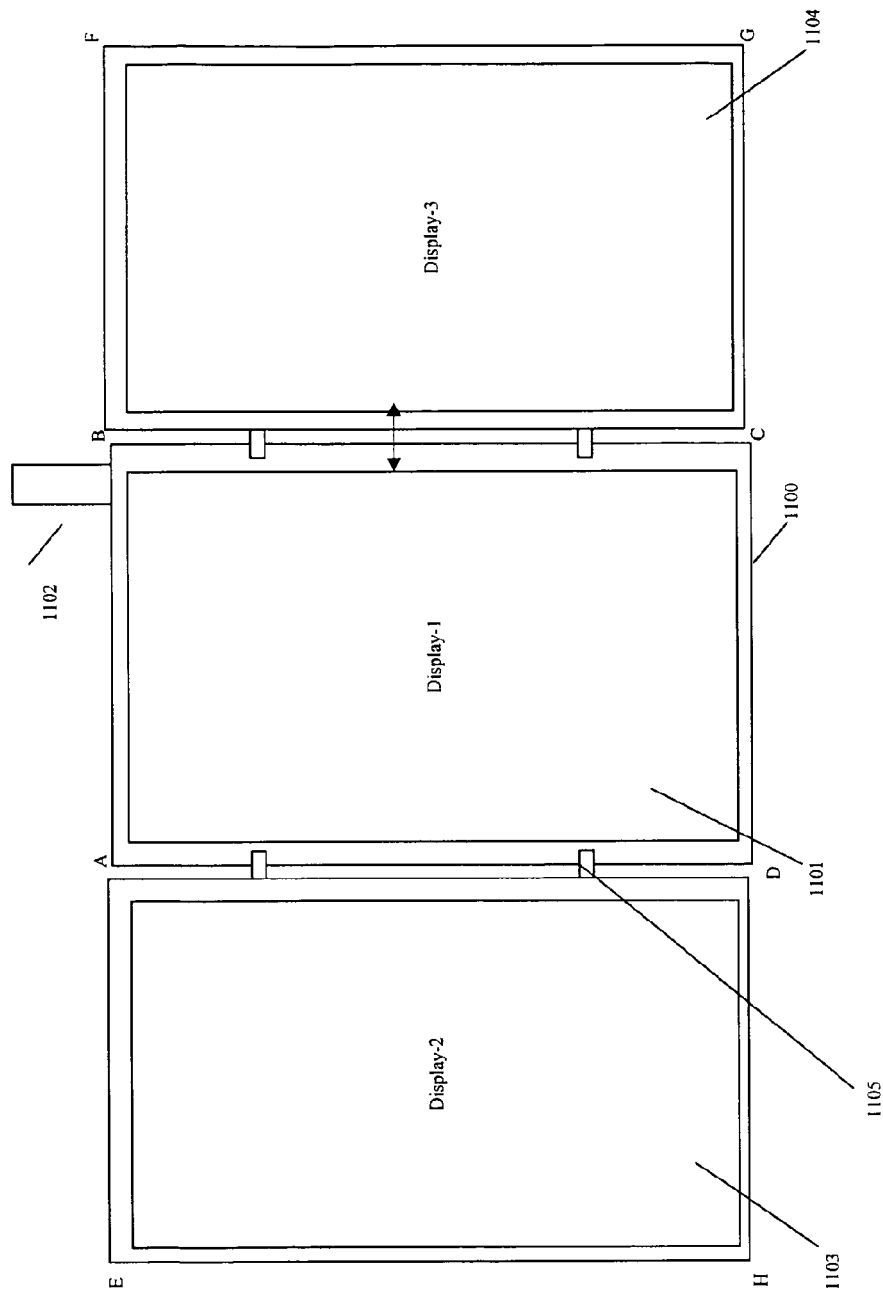
FIG. 11 shows a cellular telephone/mobile device of the present invention with the front side of the device configured with a full display area the absence of a keyboard; and further enabled for attachment of a separate display to the left and right side of said mobile device.

In another embodiment of the present invention, FIG. 11 shows a cellular telephone/mobile device, 1100 of the present invention with the front side of the device configured with a full display area, 1101 with the absence of a keyboard and an antenna 1102; and further enabled for attachment of a separate display 1103 to the left side and 1104 to the right side of said mobile device. The attachment mechanism, 1105 provides mechanical support and a wired communication between 1100 to display 1103 and between 1100 to display 1104. In another configuration one or more of the reverse sides of 1100, 1103 and 1104 may be configured with a large display for back to back viewing of similar or dissimilar content on each of said displays. The display 1103 may be swiveled around the axis AD and the display 1104 may be swiveled around the axis BC.

Example 14

The viewing of one or more of movies, video, TV and other content is enabled in this configuration as the three display areas due to their proximity visually appear as one larger display.

One or more of movies, video, TV and other content may be viewed in an integrated manner as if the three separate displays were a single display wherein the content is displayed in a seamless manner. The ability to swivel the left and right displays around their axis provides near three dimensional viewing experiences to the user. This configuration is also highly desirable for viewing spread sheets and for graphic intensive gaming applications for viewing large graphics content on a virtual single display. The individual displays may be used for viewing similar or dissimilar content and for gaining with multiple partners and for collaboration/conferencing with multiple individuals and in health care applications wherein X-ray images, MRI images and other information may be viewed in an integrated manner.

The present invention also by extension is applicable to stationary devices, televisions, media centers, personal computers, servers and other peripheral devices wherein visualization is a key factor.

Figure 12:
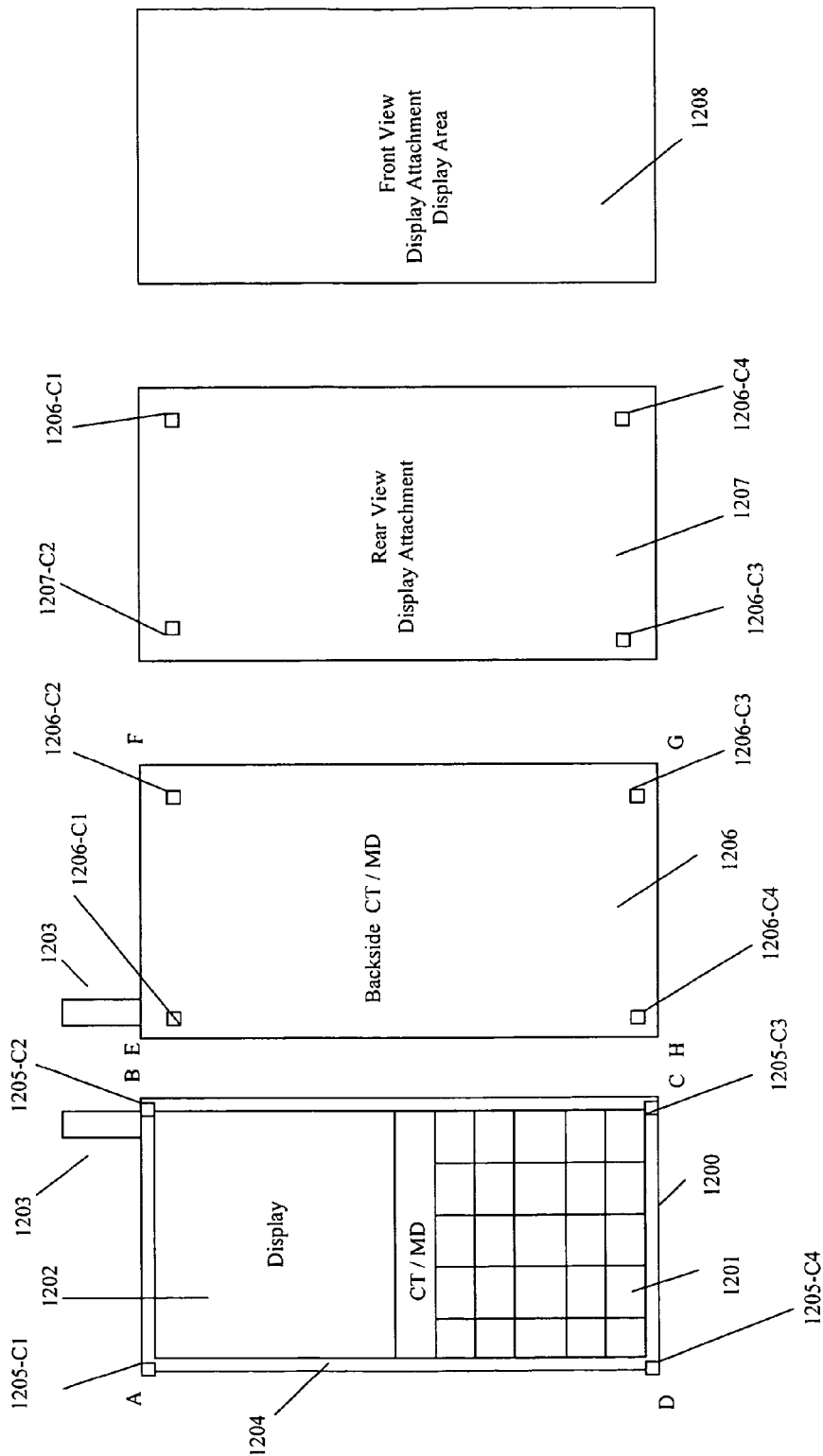
FIG. 12 shows a cellular telephone/mobile device of the present invention with the front side of the device configured with a display area and a keyboard; and further enabled for attachment of a separate full display to one or more of the front and reverse/obverse side of said mobile device.

In yet another embodiment, FIG. 12 shows a cellular telephone/mobile device, 1200 of the present invention with the front side of the device, ABCD, configured with a limited display area, 1202, a keyboard, 1201, an antenna 1203, a rim area 1204 and mechanisms 1205-C1, 1205-C2, 1205-C3 and 1205-C4 located at the four corners of the surface ABCD for attaching an optional larger display having a front viewing side 1208 and a back non viewing side 1207.

Example 15

Conversion of a cellular telephone/mobile device having a limited display front side display area to a configuration wherein it has a larger display area for enhanced image, graphics, TV and video applications.

The back side of the larger optional display attachment, 1207 is configured with a mechanism for providing mechanical support and electrical connections in the form of 1207-C1 which mates with 1205-C1; 1207-C2 which mates with 1205-C2; 1207-C3 which mates with 1205-C3 and 1207-C4 which mates with 1205-C4 such that upon mating the back side of the optional larger display 1207 faces down on top of the surface represented by ABCD of device 1200 and the front viewable side of the optional larger display 1208 faces up thus becoming the preferred new larger display of device 1200. In this configuration with the optional larger display attachment the display limitations of the original cellular telephone/mobile device 1200 are enhanced providing greater utility to the user for image, graphics, TV and video intensive applications without the expense associated with upgrading to an entirely new cellular telephone/mobile device having a larger display. The optional larger display 1208 may be removed and stored to convert the device 1200 back to its original small display configuration as needed.

Example 16

Conversion of a cellular telephone/mobile device having no display on the backside of the device to a configuration wherein the device has a larger display on the backside for the provision of enhanced image, graphics, TV, video applications and multiple utility to the user.

The backside of the cellular telephone/mobile device represented by, EFGH and 1206 is configured with a mechanism which provides mechanical support and electrical connections, 1206-C1, 1206-C2, 1206-C3 and 1206-C4 located at the four corners of the back side of said device.

The back side of the larger optional display attachment, 1207 is configured with a mechanism for providing mechanical support and electrical connections in the form of 1207-C1 which mates with 1206-C1; 1207-C2 which mates with 1206-C2; 1207-C3 which mates with 1206-C3 and 1207-C4 which mates with 1206-C4 such that upon mating the back side of the optional larger display 1207 faces down on top of the back surface, EFGH, represented by 1206 and the front viewable side of the optional larger display 1208 faces up thus becoming the preferred new backside display of device 1200. In this configuration with the optional larger display attachment the lack of a display on the backside of the original cellular telephone/mobile device 1200 is overcome thus providing greater utility to the user for image, graphics, TV and video intensive applications without the expense associated with upgrading to an entirely new cellular telephone/mobile device having a larger display. The optional larger display 1208 may be removed and stored, as needed, to convert the device 1200 back to its original configuration wherein there was no display on the backside of said device. The novel embodiment of the present invention provides greater utility to the user for applications that are image, graphics, TV and video intensive. The present invention illustrates one type of mechanism for mating an optional reconfigurable display to a cellular telephone/mobile device. However, this illustration is not to be construed as limiting and those skilled in the art may configure other mechanisms for mating an external display to a mobile device. The present invention is intended to cover various alternate methods, mechanisms and systems which accomplish the novel teachings of the present invention.

Example 16A

In the prior art, a laptop computer when open has a display screen on the inside cover viewable when open at one or more angles; and a standard keyboard on the base surface such that the user may view the display and perform operations on the keyboard. In the case wherein the display is touch sensitive, operations may be performed on the touch screen display. However, in the prior art the display screens are not configured to be touch sensitive and do not provide the optional and enhance utility that may be derived from the use of a touch screen. Additionally, the lap top computer primarily serves the needs of a single user and does not lend itself for collaborative viewing.

In the present invention, the top cover of the lap top computer is configured with an additional display screen, such that the inside display screen and the top cover display screen are positioned back to back. In this configuration, when the lap top cover is open vertically or at any angle, another individual sitting on the opposite side is enabled to view the top cover display screen. In a configuration, where in the top cover display screen is touch sensitive, a second individual may perform one or more input/output operations to derive the selected utility. The top cover display screen may be protected by a cover for mechanical/scratch protection. The present invention enables easy collaboration with one single device. Alternately, the lap top computer may be operated by sliding open the protective cover of the display and operated using the touch screen of the top display obviating the need to fully open the lap top computer and using either of the inside display or the inside keyboard.

The present invention enables the optional reconfigurable displays to be powered and driven by the one or more of the central built-in electronics, processors, graphics chipsets, display drivers and memory of the mobile device. In an alternate embodiment of the present invention the electronic circuitry for the operation of the optional reconfigurable displays may be built into the optional display unit itself including the power sources required to independently power said optional reconfigurable displays. The communication between the optional reconfigurable display units and the cellular host telephone/mobile device is intended to be one or more of wired and wireless utilizing a plurality of communication protocols. The present invention is intended to cover stationary devices, lap top computers, PDAs as well and is not to be construed as limited to cellular telephones/mobile devices. The software that enables the reconfigurable display applications may reside in one or more of the display unit itself, the cellular telephone/mobile device, a local server and a network server wherein said software applications are accessible by one or more of said devices by wired or wireless communication means in one or more of real time and at a selected time.

Figure 13:
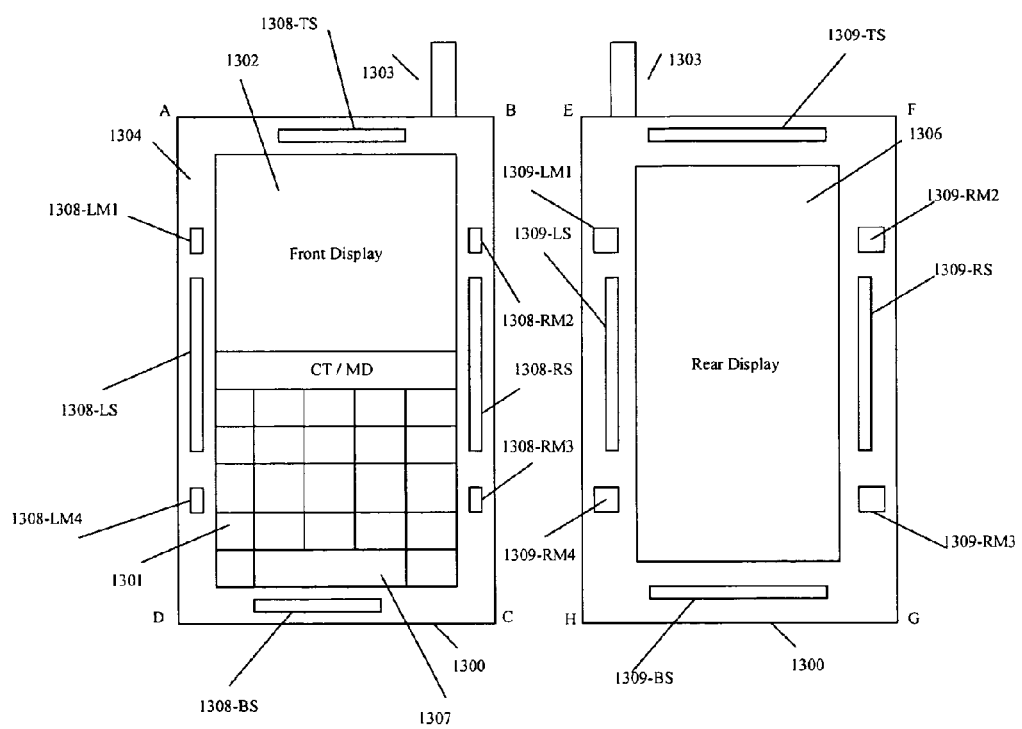
FIG. 13 shows a cellular telephone/mobile device of the present invention with the front side of the device configured with a display area and a keyboard; and further configured with a plurality of speakers on one or more of the left front side, right front side, top front side and the bottom front side; and further configured with a plurality of microphones on one or more of the left front side, right front side, top front side and the bottom front side.

In yet another embodiment of the present invention, FIG. 13 shows a cellular telephone/mobile device, 1300 of the present invention with the front side, ABCD, of the device configured with a front display area, 1302, a keyboard 1301, a biometric authentication port/mechanism/interface 1307, a rim area, 1304 surrounding the display and an antenna 1303; and further configured with a plurality of speakers on one or more of the left front side, 1308-LS, right front side 1308-RS, top front side, 1308-TS and the bottom front side, 1308-BS; and further configured with a plurality of microphones on one or more of the left front side, 1308-LM1 and 1308-LM2, right front side 1308-RM1 and 1308-RM2. The arrangement shown is for illustration purposes and is not to be construed as limiting as other arrangements are possible for those skilled in the art. The speakers are intended to provide audio, voice music and related sound output from one or more directions with the objective of providing enhanced listening experience to the user for audio/voice/speech intensive applications in a standalone manner and/or in conjunction with images, graphics, TV and video. The present invention provides multi directional high quality sound output to fully complement the enhanced video experience from high resolution displays. In the present invention, the built-in general purpose processor is augmented by specialized processors such as a plurality of dedicated audio signal processor and video signal processors to provide enhanced multimedia experience at anytime and anywhere. The speakers may be configured and aligned to derive superior surround sound. An optional mechanism may be provided to tilt/align one or more of the speakers by user selection. Alternately, the speaker output may be software configurable to suit the requirements of the user.

In a similar manner there is a need for improving the sound pick up of a cellular telephone/mobile device as the current microphone technology and microphone placement is not adequate, especially for true omni-directional sound pickup. A plurality of microphones are configured on the device 1300 to increase the sound/audio pick up from one or more of an individual, a group of individuals and an ambient environment and improve the fidelity of the sound. The microphones may be adjustable by hardware and software means and one or more of the microphones may be selectively turned on off.

In another alternate embodiment, the cellular telephone/mobile device, 1300 may be configured with an additional rear display, 1306 capability wherein 1309-LS is a left speaker, 1309-RS is a right speaker, 1309-TS is a top center speaker and 1309-BS is bottom center speaker; and 1309-LM1 and 1309-LM4 are left microphones, 1309-RM1 and 1309-RM2 are right microphones for enhanced sound pick up. In the present invention the user is enabled to turn on/off one or more of the speakers and the microphones for privacy and other reasons including potential feed back noise. Additionally, the user may configure the balance between one or more of the speakers by software means instead of with mechanical adjustments alone. Similarly, the user may configure the balance between one or more of the microphones by software means instead of with mechanical adjustments alone.

In addition to cellular telephones/mobile devices the teachings of the present invention are applicable to a new class of portable electronic equipment/appliances that provide audio, video and television services using one or more types of wired and wireless communication protocols including Wi-Fi and Internet Protocol, IP communication methods whether it is at home, at the office or on the move in a transportation environment.

Figure 14:
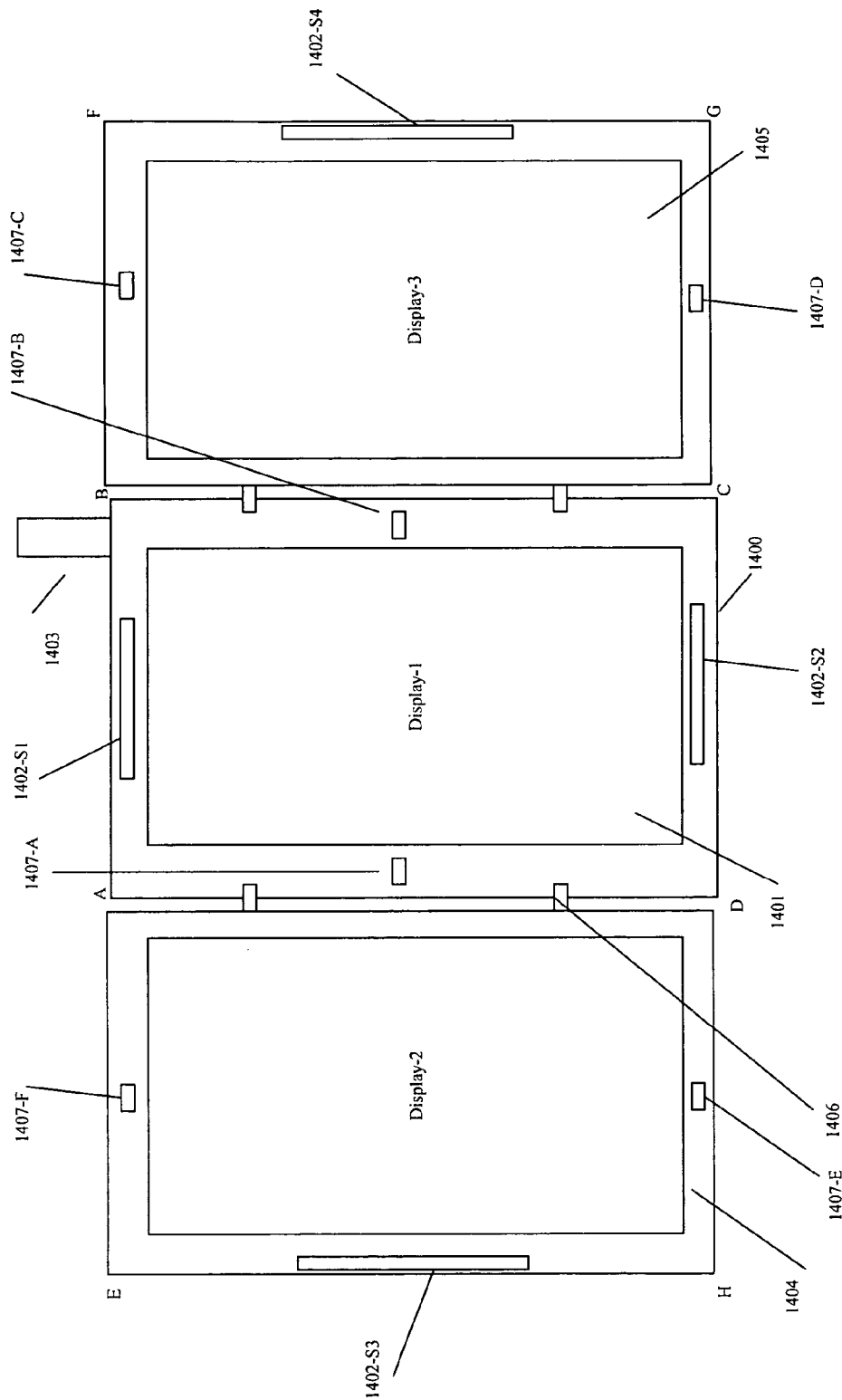
FIG. 14 shows a cellular telephone/mobile device of the present invention with the front side of the device configured with a full display area the with the absence of a keyboard wherein the top front side and the bottom front side are each configured with a speaker; and further enabled for attachment of a separate display to the left and right side of said mobile device wherein each of said displays are configured with a speaker.

In another embodiment of the present invention, FIG. 14 shows a cellular telephone/mobile device, 1400 of the present invention with the front side of the device configured with a full display area, display-1, 1401 and the absence of a keyboard wherein the top front side and the bottom front side are each configured with a speaker 1402-S1 and 1402-S2 respectively; and further enabled for attachment of a separate display-2, 1404 to the left and a display-3, 1405 to the right side of said mobile device wherein each of said displays 1404 and 1405 are configured with a speaker 1402-S3 and 1402-S4 respectively. The antenna is represented by 1403. The display-1 is configured with a plurality of microphones, 1407-A and 1407-B for acquiring voice/speech/sound information. The display-2 is configured with a plurality of microphones, 1407-E and 1407-F for acquiring voice/speech/sound information. The display-3 is configured with a plurality of microphones, 1407-C and 1407-D for acquiring voice/speech/sound information.

The mechanism for snapping on/snapping off/attaching the display-2 and display-3 to the left and right sides of the cellular telephone/mobile device display-1 is represented by 1406. The wired electrical connection between display-1 and display-2; and between display-1 and display-3 is also represented by 1406. The communication path between display-1, display-2 and display-3 may be in a plurality of wired and wireless communication protocols. One or more of the displays may be touch sensitive. The display-2 is configured for rotation around the axis AD and the display-3 is configured for rotation around the axis BC. In another novel embodiment one or more of the display-1, display-2 and display-3 may be configured with an additional display on the rear of each of display-1, display-2 and display-3 for dual sided utility such in demonstration, collaboration and conferencing. The inputs to the display may be by touch sensitive means including one or more of virtual touch screen enabled key/keys/keyboard and voice input.

Example 17

Figure 17:
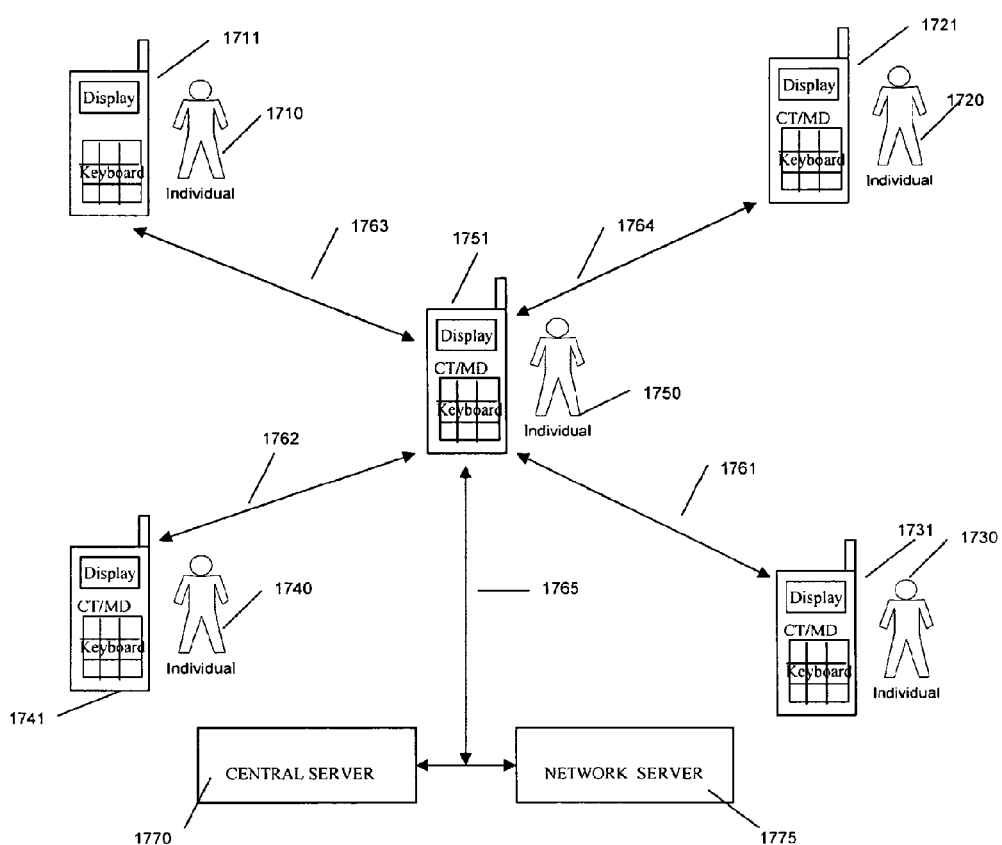
FIG. 17 shows a first cellular telephone/mobile device with its built-in web server performing the functions of a mobile server, wherein said mobile device is configured for communicating information to a plurality of other cellular telephones/mobile devices in one or more of a standalone manner, in conjunction with a central server and in conjunction with a network server.

In the configuration represented by FIG. 17, one or more of similar and dissimilar video, images, graphics and other information may be viewed contemporaneously on display-1, display-2 and display-3. In the case of touch sensitive displays, contemporaneous input/output on each of said displays is made possible enabling parallel processing with one single mobile device. Each display may have its on board electronics to do local processing of information within said display device in conjunction with an associated cellular telephone/mobile device and other client devices such as a PC and one or more networked servers.

Example 18

The ability to independently rotate and position the display-2 and display-3 provides the ability to view the content in order to achieve an almost three dimensional effect. Videos, movies and TV shows may be watched with content that is specifically configured for delivery to display screens capable of axial rotation to provide a three dimensional effect or a surround viewing experience including a surround sound effect. The content may be software programmed for seamless delivery to one or more of said three screens to provide the desired visual and audio experience.

Figure 15:
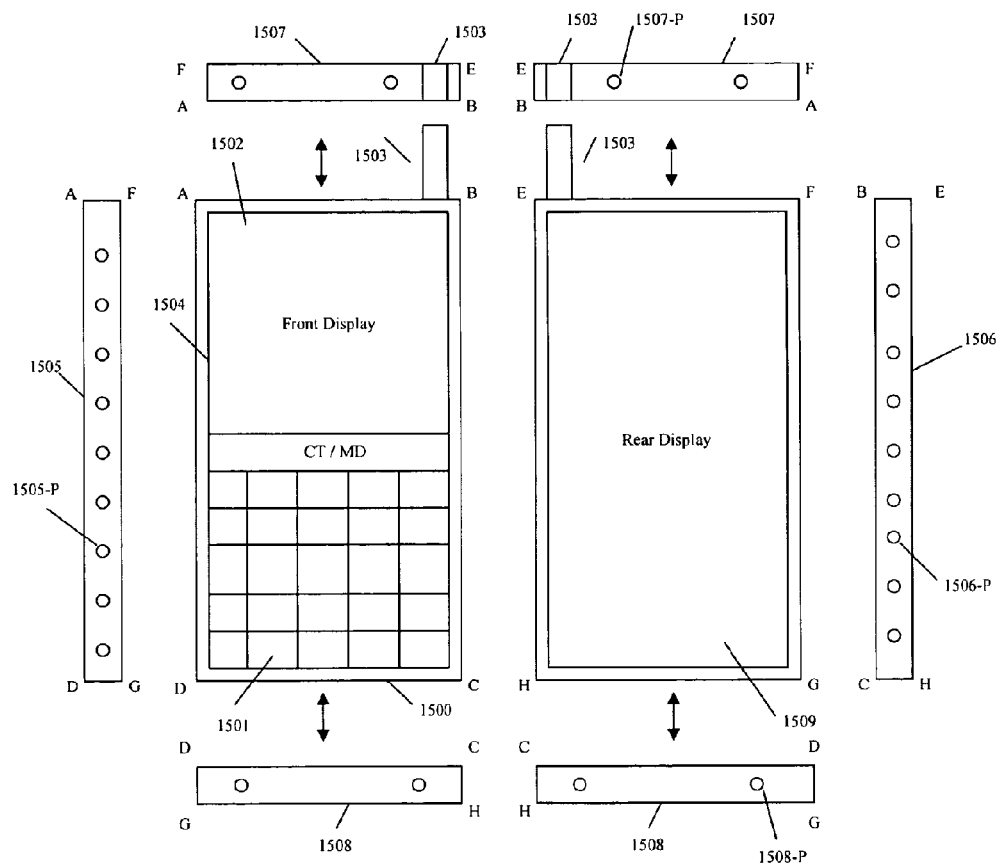
FIG. 15 shows a cellular telephone/mobile device of the present invention with the front side of the device configured with a display area and a keyboard; and the obverse side configured with a full display area; and one or more of the remaining four sides of the device configured with a plurality of perforations in one or more geometric forms for dissipation of the heat generated within the mobile device and its associated electronics through said perforations to the ambient external of said mobile device.

FIG. 15 shows a cellular telephone/mobile device, 1500 of the present invention with the front side of the device configured with a display area, 1502 and a keyboard, 1501 and an antenna 1503; and the obverse side configured with a full display area, 1509; and one or more of the remaining four sides, 1505, 1506, 1507 and 1508 of the device configured with a plurality of perforations, 1505-P, 1506-P, 1507-P and 1508-P respectively. The perforations may be configured in one or more geometric forms for dissipation of the heat generated within the mobile device and its associated electronics through said perforations to the ambient external of said mobile device.

Example 19

The cellular telephones/mobile devices of the present invention may be configured with multiple general purpose and special purpose processors to perform a number of varied functions and multi-tasking. As the cellular telephones/mobile devices become portable complex communication, computation, command and control hubs with significant processing power, there is a need to enable these devices to operate without getting overheated as a result of the natural functioning and the physics of the electronic components built into these units. Electronic circuit performance generally degrades as a result of increased temperature due to increased leakage currents generated within said components. Therefore there is a need to cool these components and to provide heat dissipation paths. In another novel embodiment of the present invention, it teaches a means for providing one or more heat dissipation paths which may be located on one or more of the six or more surfaces of the cellular telephone/mobile device. In the prior art of record, the cellular telephones/mobile devices do not have mechanisms that enable heat dissipation. Additionally, the present invention is intended to include one or more optional fan mechanisms that performs the function of moving air/circulating air across the electronic components internal of said cellular telephones/mobile devices through one or more of said perforations. In another novel embodiment of the present invention, the ability to dissipate heat may be augmented by inserting one or more cold packs as needed into a slot of the cellular telephone/mobile device such that the internal electronics are either maintained at the ambient temperature or below the ambient temperature. The present invention additionally incorporates the need for cryogenic cooling, since as a general physical phenomenon complementary metal oxide semiconductor, CMOS devices and other electronic components operate significantly better at lower than ambient temperatures.

Figure 16:
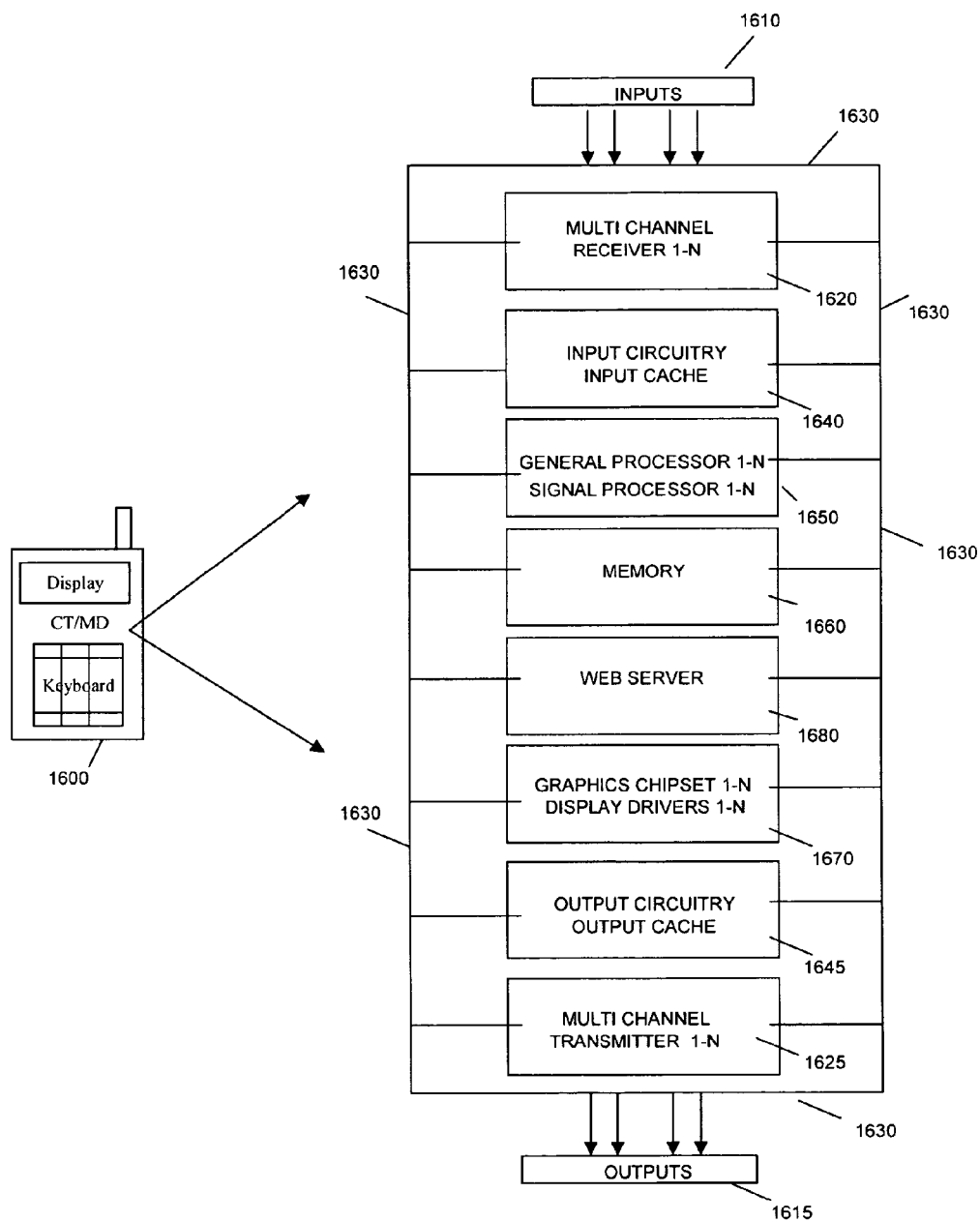
FIG. 16 shows a cellular telephone/mobile device of the present invention, further showing in detail the block level electronic circuitry comprising a multi-channel receiver, a plurality of signal processors, a plurality of main processors, a plurality of graphic chipsets, a plurality of display drivers, a multi-channel transmitter, an input electronics and an output electronics block powering the functionality of said mobile device.

FIG. 16 shows a cellular telephone/mobile device, 1600 of the present invention, further showing in detail the block level electronic circuitry internal to said device, comprising an input block 1610, a multi-channel receiver 1620 having a plurality of input channels, an input circuitry and input cache, 1640, a plurality of signal processors and general processors, 1650, a plurality of one or more types of memory, 1660, a web server, 1680, a plurality of graphic chipsets and a plurality of display drivers, 1670, an output circuitry and output cache, 1645, a multi-channel transmitter having a plurality of output channels, 1625, and an output block 1615 powering the functionality of said cellular telephone/mobile device. One or more inputs may be communicated to the device 1600 utilizing a plurality of communication protocols. Said input communications are received on one or more channels of the multi-channel receiver 1620. In an alternate embodiment of the present invention, one or more of the input channels of

1620 may be multiplexed from a first function to a second function enabling limited input channels to be configured for additional communications based on the duty cycle of each channel. The input information may be converted from a first communication protocol to a second communication protocol by the functional block 1620. The inputs are then communicated via the common device bus 1630 to other functional blocks of the circuitry of said device. While only one bus 1630 is shown for convenience, there may be more than one main bus and multiple sub-buses for communicating information from one circuitry to another. The present invention enables the inputs to be cached for appropriate queuing, prioritizing and processing by one or more of the general processors and special signal processors, shown together for convenience in a single block as 1650. Special processors may be a plurality of audio signal processors that process voice, speech and audio such as music. Another example of special processors may be a plurality of video/graphics signal processors that process photo, image, graphics, TV and video such as movies. The memory block 1660 comprises of a plurality of memory types such as dynamic random access memory, static random access memory, programmable memory, hard disk memory and other types of memory. In the prior art the use of a web server in a cellular telephone/mobile device is not utilized. Rao et al in the parent cross reference applications cited teach the use of a web server. The present invention incorporates said teaching into a cellular telephone/mobile device to provide a number of novel functions and enhanced utility for multimedia applications as would be further illustrated in the accompanying examples. The present invention incorporates a plurality of graphic chips/chipsets, 1670, for processing and presenting various graphics intensive information such as in video games. The graphic chips/chipsets may be incorporated into one or more of the processors and even integrated into one or more of the integrated circuit implementations of the cellular telephone/mobile device. A special case of such an implementation is a single chip cellular telephone/mobile device that incorporates some or all of the functional blocks illustrated in FIG. 16. The processed information is presented to the output circuitry/output cache 1645. The communication between various functional blocks is via one or more of the communication buses shown as 1630. Additionally, the communication between the functional blocks may be by wired or wireless communication means.

One or more outputs may be communicated external of the device 1600 utilizing a plurality of communication protocols. Said output communications are transmitted on one or more channels of the multi-channel transmitter 1625. In an alternate embodiment of the present invention, one or more of the output channels of 1625 may be multiplexed from a first function to a second function enabling limited output channels to be configured for additional communications based on the duty cycle of each channel. The output information may be converted from a first communication protocol to a second communication protocol by the functional block 1625. The outputs are then communicated via the common device bus 1630 to other one or more of the other functional blocks of the circuitry of said device and external of said device such as to client device by the selected communication protocol.

Thus the present invention teaches a multi-protocol communication device for audio, video and TV intensive applications wherein high quality audio and video communication and presentation/display is enabled for enhancing the user experience. The foregoing is for illustrative purposes and may not be construed as limiting in scope. Other functional block circuit implementations may be possible for those skilled in the art and the foregoing is not intended to be exhaustive but illustrative to teach the essential enabling novel features of the present invention.

Example 20

The present invention teaches the caching of the information received by one or more of the inputs and the caching of information to be transmitted by one or more of the outputs. Audio and especially video requires that information be cached in order to present said processed information in a selected format such as a first display using a first display format/technology and a second display using a second display format/technology. The streaming of audio and video information from an external source/client device to a cellular telephone/mobile device may be at a first rate of information transfer/delivery to said device whereas the processing and consumption of said processed information may be at an entirely slower/different rate thus requiring the caching of the information for presentation at a selected time in a selected format on a selected output interface/display for seamless effect.

Additionally, the information received on the inputs may be in a first form of intelligence/communication protocol and the information to be presented/communicated on one or more of another port of the device and external of the device may be in one or more of a second form of intelligence and at a second rate of information transfer/streaming. The present invention enables seamless audio, video and TV communication to/from a first cellular telephone/mobile device and one or more of second cellular telephone/mobile device and a client device such as a server. In another embodiment of the present invention, the information/content in the form of audio, video, TV and other content may be stored/cached at a server and communicated on demand to a plurality of cellular telephones/mobile devices upon a request/on demand.

FIG. 17 shows a first cellular telephone/mobile device, 1751 with an associated user 1750 where in 1751 is configured with a built-in web server capability for performing the functions of a mobile server, wherein said mobile device is configured for communicating information with a plurality of other cellular telephones/mobile devices, 1711 associated with user 1710 via wired or wireless path 1763, 1721 associated with user 1720 via wired or wireless path 1764, 1731 associated with user 1730 via wired or wireless path 1761 and 1741 associated with user 1740 via wired or wireless path 1762. The cellular telephone/mobile device may perform the functions of a mobile server in one or more of a standalone manner, in conjunction with a central server, 1770 and in conjunction with a network server 175 wherein the communication between the cellular telephone/mobile device 1751 and one or more of the servers is via a wired or wireless communication path 1765.

Example 21

In a novel embodiment of the present invention a cellular telephone/mobile device is configured to perform the full functions of a web server as if it were a stationary server residing in a geographical fixed location. At times one cellular telephone/mobile device may have information and content that needs to be communicated on demand to one or more other cellular telephones/mobile devices and other client devices. The prior art of record does not teach a cellular telephone/mobile device performing the functions of a web server. Conferencing and collaboration requires the communication of information from a central repository such as device 1751 to one or more other devices 1711, 1721, 1731 and 1741. The device 1751 may have the content already present within said device and in which case the selected information is communicated by device 1751 to other selected devices. In the event 1751 does not have some or all of the content/information, then device 1751 obtains the selected information from one or more of the servers 1770 and 1775 via the wired or wireless communication path 1765 and then parses the selected information to one or more of the other devices 1711, 1721, 1731 and 1741 by wired or wireless communication means. As an example a single user 1751 having the content/information may transmit/stream the selected information to a plurality of the other users. The present invention facilitates the coordinated communication and broadcasting of selected audio and video information from one cellular telephone/mobile device to a plurality of other cellular telephones/mobile devices/client devices and their associated users. This enumerated feature/capability is novel and enables audio and video to be broadcast to a wide audience as if the mobile device 1751 itself was a major stationary broadcast facility. The present invention therefore enables rich multimedia communication and broadcasting of content/information between individuals, groups and organizations enabling real time communication and collaboration at anytime and anywhere. In another embodiment of the present invention, the content/information may be acquired by the device 1751 in real time utilizing various features of the device 1751 such as one or more of a built-in camera and a built in microphone and other attachments to communicate/broadcast said acquired content/information to a plurality of other cellular telephone/mobile devices, stationary devices, personal computers and servers in real time or at a selected time. In another embodiment of the present invention, a plurality of cellular telephones/mobile device may be configured with a web server capability in order to achieve a multi device communication/broadcast capability for selected information/content between selected devices forming a wired or wireless network.

Example 22

For a selected communication of content/information a first cellular telephone/mobile device may serve as a mobile server wherein one or more of a plurality of other cellular telephones/mobile devices, peripheral devices and servers are configured to act as client devices at a selected time and for a selected duration of time. At one or more of a selected different time and for a selected different content/information a second cellular telephone/mobile device may serve as a mobile server wherein one or more of a plurality of other cellular telephones/mobile devices, peripheral devices and servers are configured to act as client devices for a selected duration of time. The present invention enables the dynamic designation of a first cellular telephone/mobile device as a mobile server for performing a specific and selected server related task in a communication network comprising a plurality of other cellular telephones/mobile devices, peripheral devices and servers. The present invention also enables the dynamic configuration of a network with one or more cellular telephones/mobile devices defined as mobile servers to perform one or more selected server functions within said dynamically configured network.

Figure 18:
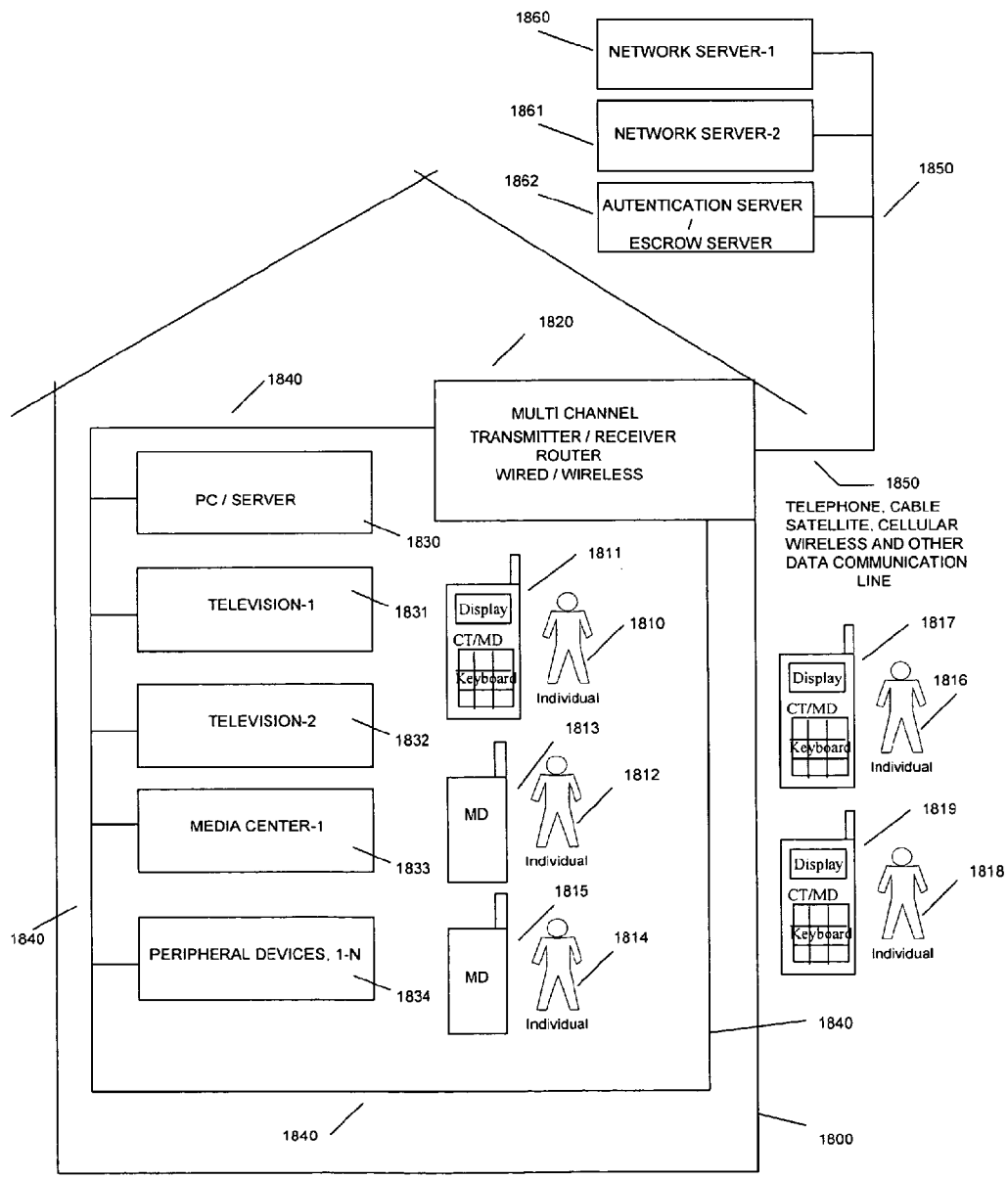
FIG. 18 shows a system level architecture wherein one or more of the cellular telephones and mobile devices are networked by wired or wireless means with a PC/Server, a plurality of Televisions, a plurality of media centers, a plurality of peripheral devices and a multi-channel transmitter/receiver/router that facilitates communication internal to the environment and external to the environment with the outside world comprising one or more of network servers and an authorization server via a plurality of outside communication paths.

FIG. 18 shows a system level architecture wherein one or more of the cellular telephones and mobile devices are networked by wired or wireless means with a PC/Server, 1830, a plurality of Televisions, 1831 and 1832, a plurality of media centers, 1833, a plurality of peripheral devices, 1834 and a multi-channel transceiver/router, 1820 that facilitates communication internal to the environment, 1800 via a wired or wireless communication path, 1840; and external of the environment with the outside world via a plurality of wired or wireless communication paths, 1850 wherein the outside world comprises of one or more of network servers, 1860, 1861, and an authentication/escrow server, 1862. The communication path 1850 may be via Wi-Fi, satellite, cable, Internet, telephone, cellular, Bluetooth and one or more of private and public carrier communication paths. FIG. 18 further shows a plurality of mobile devices, 1811 associated with individual 1810; 1813 associated with individual 1812; 1815 associated with individual 1814 internal of said environment; and external of said environment with device 1817 associated with individual user 1816 and device 1819 associated with individual user 1818.

The following examples serve to illustrate the utility and function of the system level architecture and devices comprising said architectural network defining an environment such as home, office, factory or institution.

Example 23

Command and control of intelligent personal computers, servers, peripheral devices and intelligent media appliances. The cellular telephone/mobile device of the present invention may be programmed by software means to serve as a device for the command and control of numerous appliances such as televisions, media centers within a home environment. One or more standard keys, touch screen enabled icons, voice, speech and biometric information related to a specific individual may be used to authenticate the individual and provide personalized services. The information related to the specific individual and the personalization may be stored within the device 1811, within a server 1830 and a network server 1860.

Example 24

Communicating content/information between and among the mobile device and the other devices within and external of the environment. The cellular telephone/mobile device 1811 may transfer content/information contained within said device to one or more of the devices within the network, such as songs, song lists, video and video lists for seamless experience at home and on the go.

While in the home environment the device 1811 may bypass the public/private carrier and use direct communication means by one or more methods including direct wired/wireless communication with a selected device such as television 1831 and a media center 1833. Alternately, the device 1811 may indirectly communicate with a multi-channel transceiver 1820 and through the communication path 1840 with one or more of the devices forming said home network for the acquisition/delivery of content/information seamlessly.

Example 25

Authentication and use of copy right protected content/information. In the present invention the device 1811 may be configured with the instantaneous capability for acquiring the biometric information of an individual such as photo, handwriting, voice, finger print, retinal scan and other types of biometrics. The acquired biometric information is communicated in real time to an authentication/escrow server 1862 wherein the biometric authentication parameters related to the individual are maintained in escrow/safe custody. The server 1862 compares the biometrics of the individual against a data base of information contained in 1862 and communicates either an approval or a negation of approval to a specific other device, such as 1833 directly or via the multi-channel transceiver/router for enabling an intended operation such as enabling an audio program and a video program to be played by the media center 1833 for either viewing/listening on one or of the televisions 1831, 1832, the PC, 1830, peripheral devices 1834 and one or more mobile devices 1811, 1813, 1815, 1817 and 1819. For example content residing within a home media center/PC/server may be remotely accessed via biometric authentication from within the home environment or from outside of the home environment. Alternately, as an example, a mother at home may provide audio and video content using a device 1811 to a daughter's device 1819 wherein the daughter is outside of the home and on the road. The communication path between 1811 and 1819 may be via a first wireless communication to the media center 1833, a second communication path 1840 from media center 1833 to the multi-channel transceiver 1820, through communication path 1850 to a cellular provider and then onto the device via a cellular provider ultimately to device 1819. Any number of variations of wired and wireless communication paths may be possible depending on the required speed of communication, required level of security and authentication and the cost objectives as a result of choosing a particular method of communication versus a different method of communication.

Example 26

The present invention enables a very high level of protection of copy right material and avoids fraud and illegal content sharing when used in conjunction with the novel biometric authentication features of the present invention. Audio and video content may be purchased at a relatively attractive price if the content provider can be sure that the content will be used by the purchaser in accordance with the legal agreements governing such a transaction between the buyer and the seller. Sellers price the product relatively high to cover the hidden cost of piracy. This is because content is mostly in software form it is subject to unauthorized use/sharing. The present invention teaches a system wherein the seller requires the buyer to subscribe to an independent biometric authentication service upon purchasing selected content which is made available by the seller as an on demand product/service through the seller's web site 1860 to the buyer 1810. The buyer 1810 is defined with one or more associated and authorized devices, such as 1811. In addition, the buyer 1810 is also defined in conjunction with specific biometric authentication requirements for the provision of the product/service. The product/service may be for a single use or multiple uses. The purchase agreement may provide for one or more of a specified number of uses, in conjunction with one or more specified uniquely identifiable content appliances, such as 1830, 1831, 1832, 1833, 1834, 1811 and 1813; and for use by one or more of a single individual 1810 and a designated group of individuals such as individual 1812 in conjunction with device 1813 and individual 1814 in conjunction with device 1815. In each of these cases the authorization request precedes the playing/viewing of the content. The authorization request is communicated from the device such as 1811 to the server 1860 wherein in the content resides and is made available dynamically upon each request to the server 1860 being communicated and subsequently verified by the server 1862. The authorization and use request may be from one or more of the authorized devices and the associated users whose biometrics are maintained within the server 1862. The server 1862 provides verification to the server 1860 that one or more of the device and the associated user has been verified via biometrics. The device is verified by unique device number. The merchant server, 1860, providing the content maintains one or more databases of the profile of the transaction, the authorized devices and the associated authorized users and does not maintain sensitive biometric information of users. The authorization/escrow server 1862 maintains the biometric authorization parameters of the authorized users. The content provided by the seller via server 1860 may be time stamped for self destruction upon triggering one or more of the number of uses being exceeded, the time duration being exceeded and exceeding unauthorized attempts to share said content with one or more of unauthorized devices and the individuals associated with said unauthorized devices.

Further, the communication, collaboration, transactions, biometric information, audio and video information and related inquiries or requests can be in any form of intelligence, such as key entries from a keyboard, voice in any language, graphics such as a key click on a graphic page, mouse clicks on a view, display of images and video, audible inputs/outputs and tactile inputs and outputs. Required translations, such as from one language to another or from a tactile entry to a voice command, are made automatically.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A portable electronic device, comprising:
    a housing having a first touch screen display;
    a processor positioned within the housing and in communication with the first touch screen display;
    a memory in communication with the processor;
    a camera in communication with the processor;
    at least one wireless transmit or receive communication component in communication with the processor; and
    a cover which is attachable to the device, wherein the cover comprises a second touch-enabled display wherein the display on the cover is rotatable relative to the housing and is connected to a side of the device,
    wherein the first display and second display are configured to display different multimedia content, text, graphics, or combinations thereof simultaneously, and wherein a first application is configured for display in the first display and a second application is configured for display in the second display,
    wherein at least one of the displays is separated into a plurality of display areas,
    wherein the plurality of display areas are enabled to display multimedia content, text, graphics, or combinations thereof, and
    wherein the plurality of display areas are merged into a larger display area responsive to user selection.

2. The device of claim 1, wherein the wireless transmit or receive communication component is configured to communicate via one or more of cellular, Wi-Fi, or Bluetooth communication or combinations thereof.

3. The device of claim 1, wherein the cover comprises a physical or a virtual keyboard on the second touch enabled display.

4. The device of claim 1, wherein the device is configured to accept biometric data, wherein said biometric data comprises an acquisition finger print data.

5. The device of claim 1, wherein the first touch screen display is configured to display a plurality of touch enabled icons.

6. The device of claim 1, wherein the cover is rotatable relative to the device and wherein the second display is positionable on an opposite side of the first touch screen display.

7. The device of claim 1, wherein the first display is configured to display multimedia content, text, or graphics and wherein the second display is configured to be opaque or not display content.

8. The device of claim 1, wherein the second display is configured to display multimedia content, text, or graphics and wherein the first display is configured to be opaque or not display content.

9. The device of claim 1, wherein the first and second display are configured to display the same content simultaneously.

10. A portable electronic device or mobile device, comprising:
   a first touch screen display, wherein the first touch screen display is configured to display multimedia content, text, graphics, or combinations thereof;
   a housing having a processor positioned within the housing and in communication with the first touch screen display;
   a memory in communication with the processor;
   a camera in communication with the processor;
   a cover which is attached to the device and a second touch-enabled display which is opposite to the first touch screen display, such that the first and second touch screen display are attachable to and removable from the cover, and wherein the cover comprises a keyboard;
   an antenna located on the device, and
   at least one wireless transmit and/or receive communication component in communication with the processor for cellular, Wi-Fi, Bluetooth communication, or combinations thereof,
   wherein each display is separated into a plurality of display areas,
   wherein the plurality of display areas display different content or applications, and
   wherein at least two separate display areas are merged by software into one larger display area by user selection and the reverse thereof by user selection.

11. The device of claim 10, wherein the device is configured to display multimedia content including TV, movies, streaming video or combinations thereof and to acquire a finger print of a user.

12. The device of claim 10, wherein the cover displays a keyboard.

13. The device of claim 10, wherein the cover is rotatable relative to the housing and is positionable on a side of the device.

14. The device of claim 10, wherein the first display is configured to display a plurality of touch enabled icons.

15. The device of claim 10, wherein the cover is rotatable relative to the device such that the cover is positionable on an opposite side of the touch screen display.

16. A method of using a portable electronic device, comprising:
   providing a portable electronic device comprising a housing having a first touch screen display, a processor positioned within the housing and in communication with the first touch screen display, a memory in communication with the processor, and a camera in communication with the processor;
   providing a cover which is attachable to the portable electronic device such that the cover is positionable relative to the device to protect the first touch screen display, and the cover comprises a second touch-enabled display, and
   wherein the cover is rotatable relative to the portable electronic device such that the cover is positionable on a side of the first touch screen display,
   wherein the first touch screen display is separated into a plurality of display areas, and
   wherein the plurality of display areas display the same or different content, applications, icons or combinations thereof, and
   wherein the plurality display areas are merged into a larger display area responsive to user selection.

17. The method of claim 16, wherein the cover displays a keyboard.

18. The method of claim 16, wherein the cover is rotatable relative to the housing and is positionable on a front side of the device such that the second touch-enabled display is viewable and the first touch screen is not viewable.

19. The method of claim 16, wherein the device is configured to acquire a finger print of a user.

20. The method of claim 16, wherein the first display and second display are configured to show different multimedia content, text, or graphics simultaneously, and wherein a first application is configured for display in the first display and a second application is configured for display in the second display.

21. The method of claim 16, wherein the first display is configured to display multimedia content, text, or graphics and wherein the second display is configured to be opaque or not display content.

22. The method of claim 16, wherein the second display is configured to display multimedia content, text, or graphics and wherein the first display is configured to be opaque or not display content.

23. A portable electronic device or mobile device, comprising:
   a first touch screen display comprising a housing having a processor positioned within the housing and in communication with the touch screen display, a keyboard, a memory in communication with the processor, a camera in communication with the processor, and an antenna located on the device,
   wherein the device further has at least one wireless communication unit, the device including support for WiFi, and wherein the first touch screen display is configured to display photos, text, multimedia content, or combinations thereof; and,
   a cover which is attachable to the device and detachable from the device, wherein the cover comprises a touch-enabled surface, and wherein the cover is rotatable relative to the device such that the cover is positionable on a first side of the device and on a second side of the device or swivel around an axis,
   wherein the first touch screen display is separated into a plurality of display areas,
   wherein the plurality of display areas display the same or different content or applications or combinations thereof; and wherein the plurality display areas are merged into a larger display area responsive to user selection.

24. The device of claim 23, wherein the touch-enabled surface comprises a second touch enabled screen or touch sensitive display.

25. The device of claim 23, wherein the device is configured to display multimedia content including TV, movies, streaming video or combinations thereof.

26. The device of claim 23, wherein the touch enabled surface on the cover comprises a keyboard.

27. The device of claim 26, wherein an area of the display is configured with a plurality of touch enabled icons for actuating an intended action or function by a touch or stylus input.

28. The device of claim 27, wherein the device is configured for wireless communication using Bluetooth or a cellular or both Bluetooth and cellular.

29. The device of claim 27, wherein the device is configured to receive multimedia content from an Internet based streaming multimedia service and to display the multimedia content on the display; and wherein responsive to a user control, one or more of the icons are configured to disappear to further enhance the actual viewable display area.

30. The device of claim 23, wherein the first touch screen is a high resolution display.

\* \* \* \* \*